United States Patent
Leeb et al.

(10) Patent No.: US 10,244,747 B2
(45) Date of Patent: Apr. 2, 2019

(54) APPARATUS AND METHOD FOR DISCHARGING LIQUID AND/OR SOLID ACTIVE SUBSTANCES

(71) Applicant: HORSCH LEEB Application Systems GmbH, Oberpöring (DE)

(72) Inventors: Theodor Leeb, Wallersdorf (DE); Otto Hirthammer, Hirschling (DE)

(73) Assignee: HORSCH LEEB Application Systems GmbH, Oberpöring (DE)

( * ) Notice: Subject to any disclaimer, the term of this patent is extended or adjusted under 35 U.S.C. 154(b) by 134 days.

(21) Appl. No.: 15/035,684

(22) PCT Filed: Nov. 10, 2014

(86) PCT No.: PCT/EP2014/074182
§ 371 (c)(1),
(2) Date: May 10, 2016

(87) PCT Pub. No.: WO2015/067804
PCT Pub. Date: May 14, 2015

(65) Prior Publication Data
US 2016/0286780 A1    Oct. 6, 2016

(30) Foreign Application Priority Data

Nov. 10, 2013    (DE) .................. 10 2013 112 344

(51) Int. Cl.
*B05B 1/20*    (2006.01)
*A01M 7/00*    (2006.01)
(Continued)

(52) U.S. Cl.
CPC ......... *A01M 7/0057* (2013.01); *A01C 23/008* (2013.01); *B05B 12/08* (2013.01)

(58) Field of Classification Search
CPC .............. A01M 7/0057; A01M 7/0071; A01M 7/0075; A01M 7/0053; A01M 7/005; A01C 23/008; B05B 12/08
(Continued)

(56) References Cited

U.S. PATENT DOCUMENTS 5,971,294 A * 10/1999 Thompson .............. B05B 12/04
                                                              239/163
6,131,821 A    10/2000 Nejsum
(Continued)

FOREIGN PATENT DOCUMENTS

DE          1833453 U       6/1961
DE          3202569 A1      8/1983
(Continued)

OTHER PUBLICATIONS

Anthonis et al., Implementation of an Active Horizontal Suspension on a Spray Boom, American Society of Agricultural Engineers, 2000, pp. 213-220, vol. 43(2).
(Continued)

*Primary Examiner* — Steven J Ganey
(74) *Attorney, Agent, or Firm* — Erickson Kernell IP, LLC; Mark C. Young

(57) ABSTRACT

Disclosed is an apparatus for spreading solid active agents and a method for controlling the apparatus. A boom is pivotably mounted on a vehicle. A sensor arrangement detects an angular velocity and/or an angular position of the boom about a pivot axis. A control unit processes output signals of the sensor arrangement to control signals for an actuator to adjust the boom. The actuator has an active pressure side for each of the two adjustment directions of the boom. Approximately equal pressure levels prevail in the active pressure sides of two actuators operating in opposition or of a double-acting actuator, when the boom is
(Continued)

stationary or moves only slightly in relation to the carrier vehicle. A defined differential pressure is adjustable between the active pressure sides of the actuators when the boom is shifted in relation to the carrier vehicle.

11 Claims, 13 Drawing Sheets

(51) Int. Cl.
    *A01C 23/00* (2006.01)
    *B05B 12/08* (2006.01)

(58) Field of Classification Search
    USPC .......................... 239/69, 159–161, 163–167
    See application file for complete search history.

(56) References Cited

U.S. PATENT DOCUMENTS

| | | | | |
|---|---|---|---|---|
| 6,726,120 | B2* | 4/2004 | Schaffter | A01B 79/005 239/159 |
| 8,028,927 | B2* | 10/2011 | Ward | A01M 7/0089 239/1 |
| 8,191,795 | B2* | 6/2012 | Grimm | A01M 7/0089 239/1 |
| 8,235,231 | B2 | 8/2012 | Schneider et al. | |
| 9,151,013 | B2 | 10/2015 | Glitza | |
| 2009/0069987 | A1 | 3/2009 | Omelchenko et al. | |
| 2009/0082930 | A1 | 3/2009 | Peters | |
| 2009/0118892 | A1 | 5/2009 | Yamashita et al. | |
| 2012/0211301 | A1 | 8/2012 | Clark et al. | |
| 2012/0215410 | A1 | 8/2012 | McClure et al. | |
| 2013/0277442 | A1 | 10/2013 | Ballu | |

FOREIGN PATENT DOCUMENTS

| | | |
|---|---|---|
| DE | 4140254 A1 | 6/1993 |
| DE | 19962687 C2 | 4/2002 |
| DE | 102004033900 A1 | 7/2005 |
| DE | 102004004491 A1 | 8/2005 |
| DE | 102007025751 A1 | 12/2008 |
| DE | 102010035291 A1 | 3/2012 |
| EP | 0157592 A2 | 10/1985 |
| EP | 1416095 A1 | 5/2004 |
| EP | 1444894 A1 | 8/2004 |
| EP | 2123588 A1 | 11/2009 |
| EP | 2308755 A2 | 4/2011 |
| EP | 2042276 B1 | 11/2011 |
| EP | 2511678 A1 | 10/2012 |
| EP | 2591657 A1 | 5/2013 |
| FR | 2270774 A1 | 12/1975 |
| FR | 2779031 A1 | 12/1999 |
| FR | 2965453 | 4/2012 |
| GB | 1380029 A | 1/1975 |
| GB | 2252295 A | 8/1992 |
| JP | 06178603 A | 6/1994 |
| JP | 2004321135 A | 11/2004 |
| JP | 200829261 A | 2/2008 |
| JP | 2008129813 A | 6/2008 |
| JP | 201130464 A | 2/2011 |
| WO | 0036376 A1 | 6/2000 |
| WO | 0134511 A1 | 5/2001 |
| WO | 2004041446 A1 | 5/2004 |
| WO | 2007046980 A2 | 4/2007 |
| WO | 2010121713 A1 | 10/2010 |
| WO | 2012045964 A1 | 4/2012 |

OTHER PUBLICATIONS

Kölner Labor für Baumaschinen (KLB)—Deutsch/Cologne Laboratory for Construction Machinery (KLB)—German, http://www.mobilearbeitsmaschine.de:80/home.html, Feb. 2012, and Google Translate English translation.

Handbuch der Mess- und Automatisierungstechnik im Automobil/ Handbook of the Measuring and automation technology in the automobile Vehicle electronics, vehicle mechatronics 2nd, completely edited edition with 330 illustrations, Springer, 2006 Germany.

Khot et al., Sensor fusion for improving the estimation of roll and pitch for an agricultural sprayer, ScienceDirect, Biosystems Engineering 101 (2008), pp. 13-20, www.elsevier.com/locate/issn/ 15375110.

Ooms et al., Measurements of the horizontal sprayer boom movements by sensor date fusion, Elsevier Science, Computers and Electronics in Agriculture, 33 (2002), pp. 139-162, www.elsevier. com/locate/compag.

Tahmasebi et al., Active Force Control Applied to Spray Boom Structure, Applied Mechanics and Materials, vol. 315 (2013) pp. 616-620.

Wikipedia, Sensor data fusion, https://de.wikipedia.org/w/index. php?title-Sensordatenfusion&oldid=107055308; original and translation.

* cited by examiner

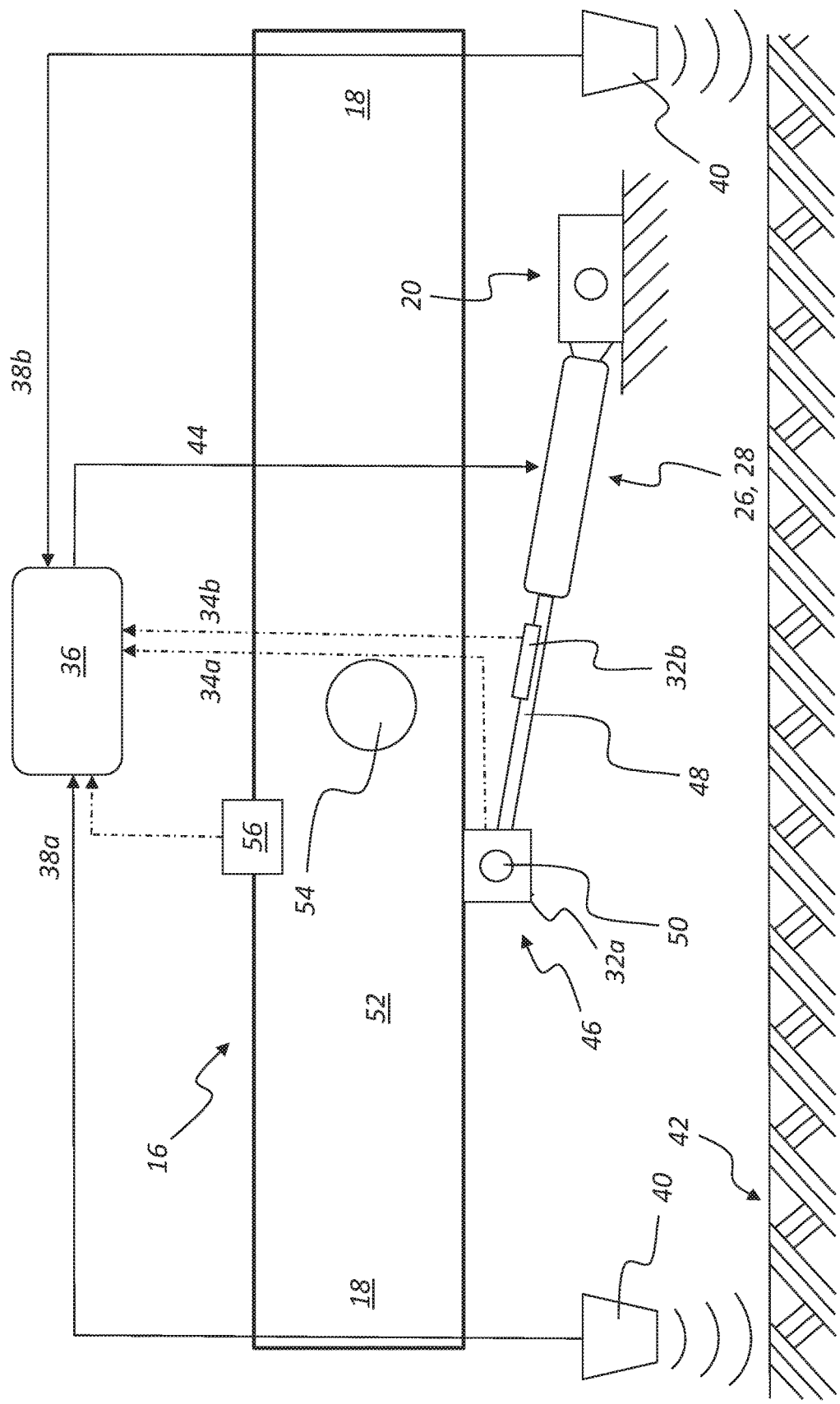

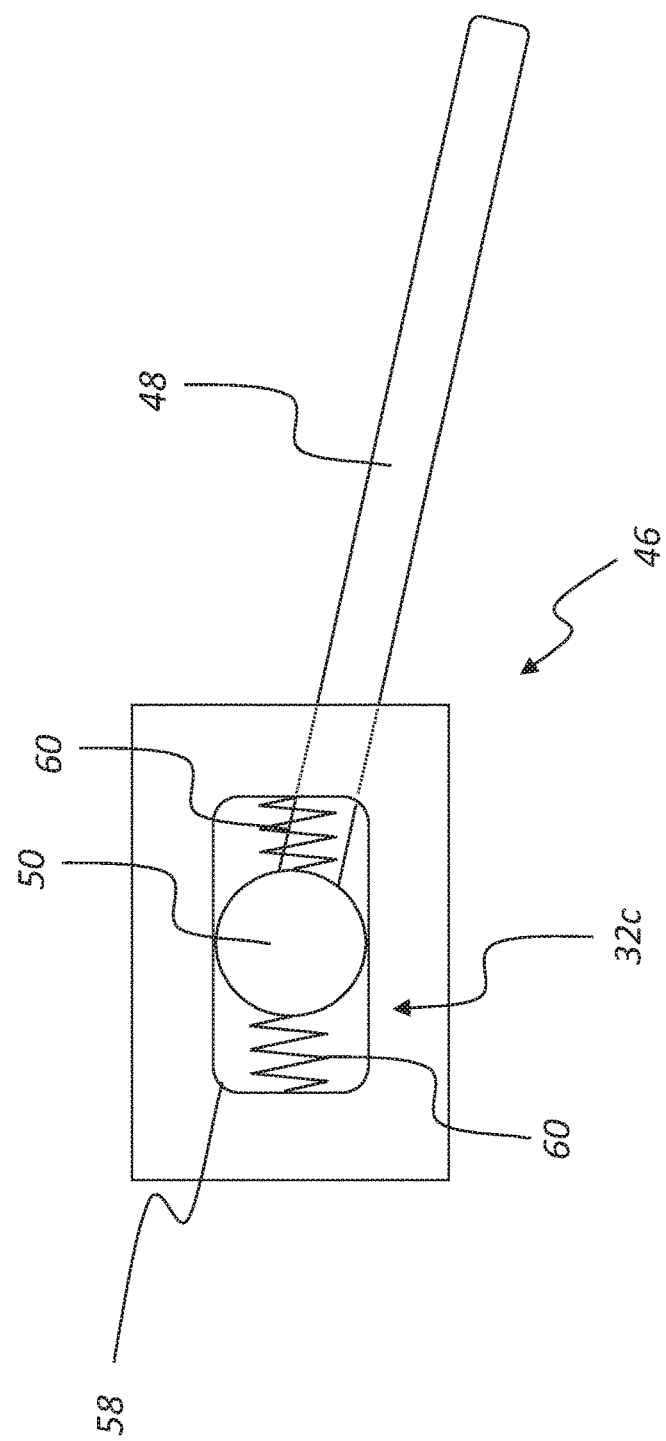

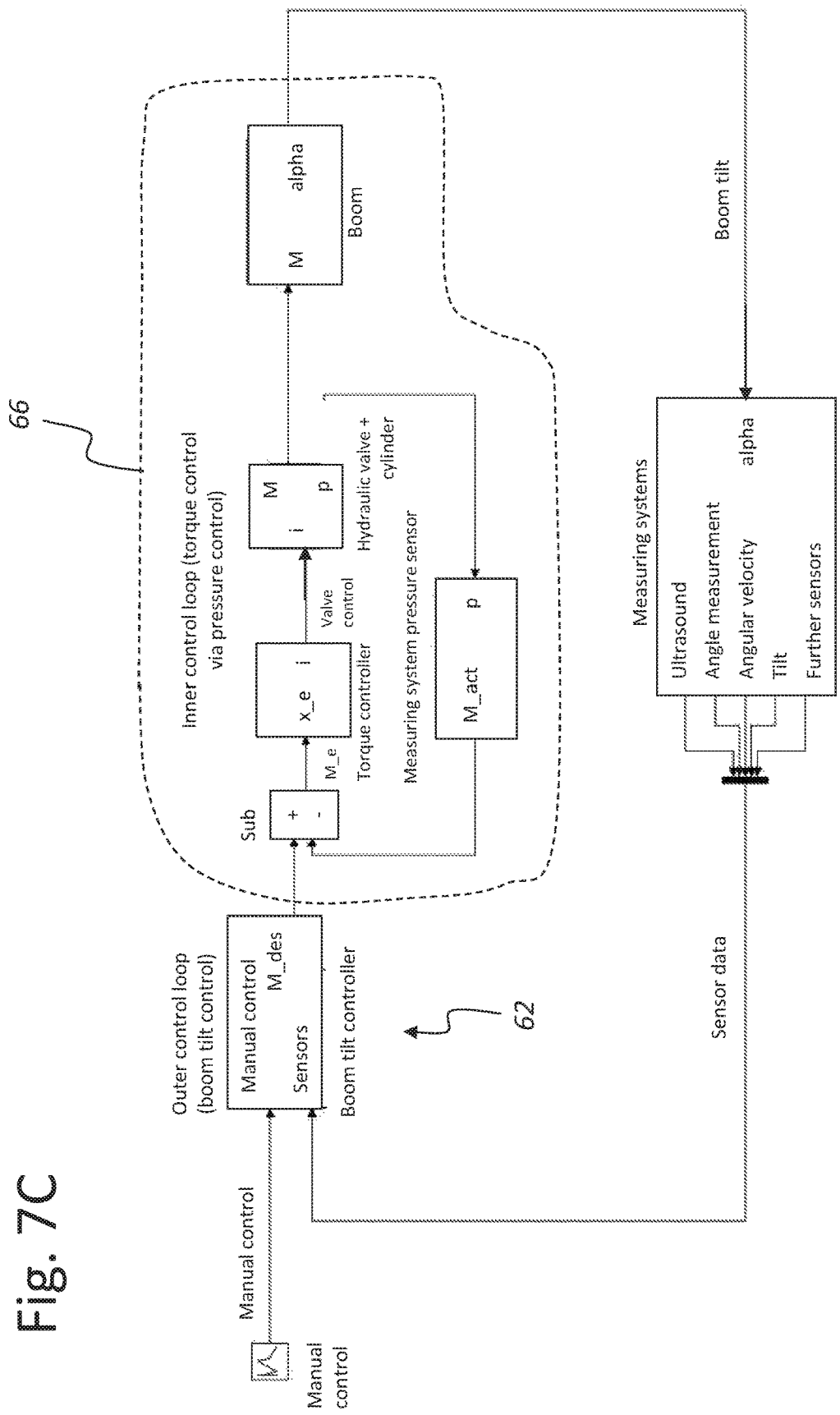

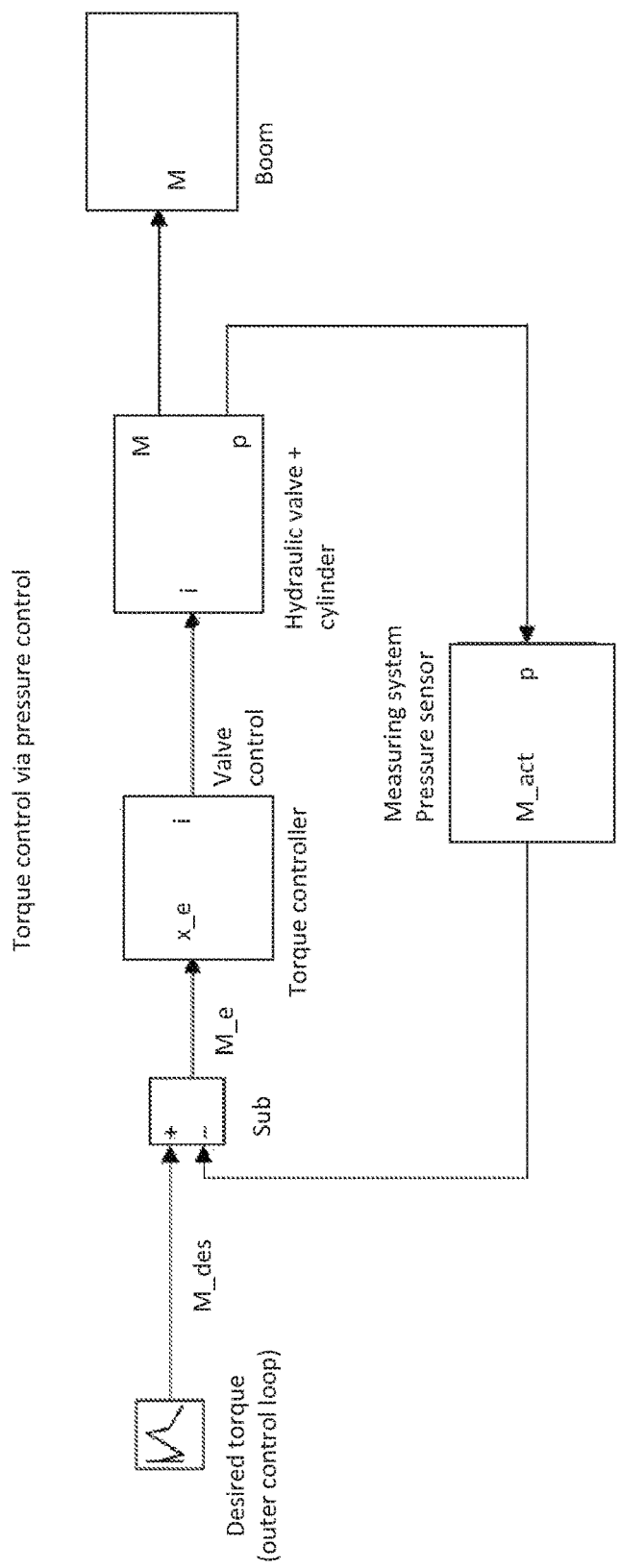

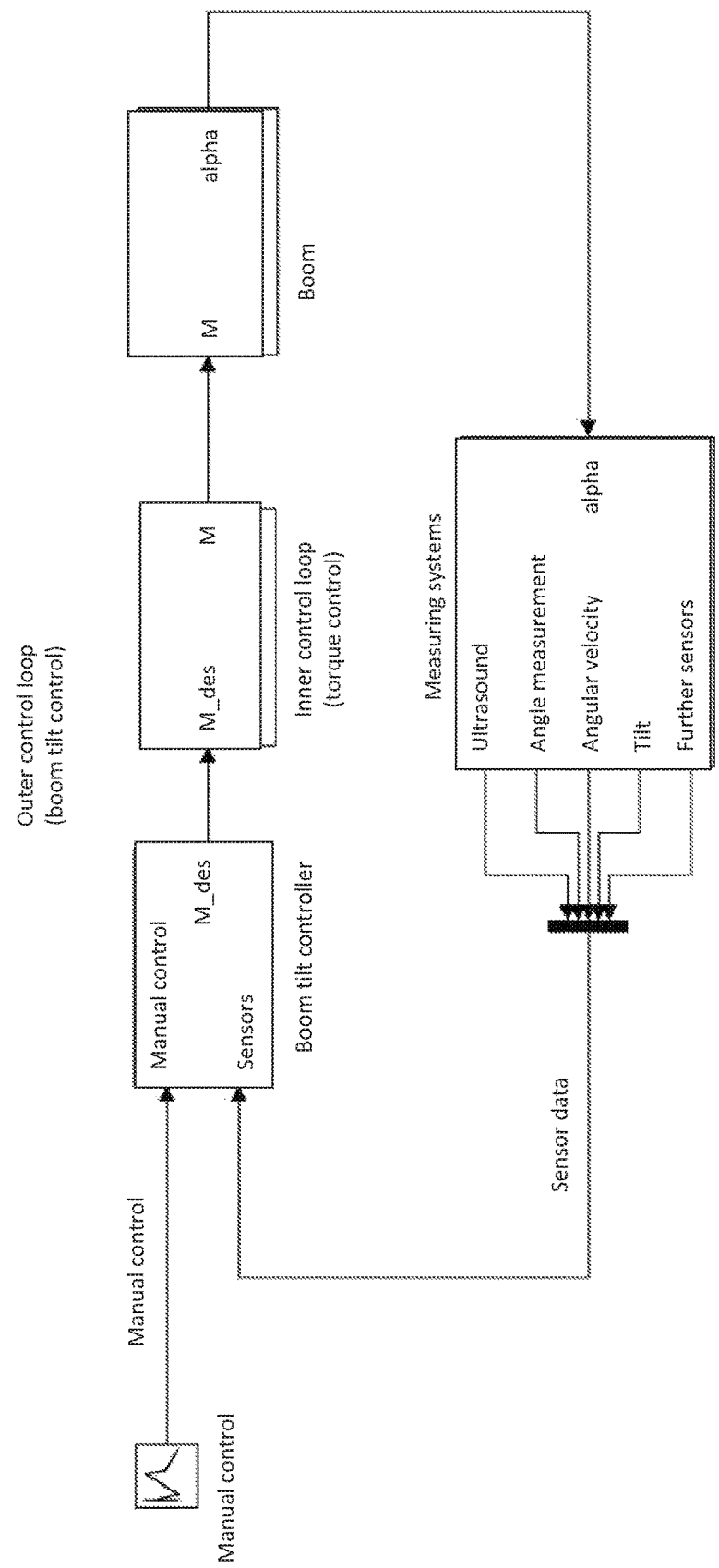

APPARATUS AND METHOD FOR DISCHARGING LIQUID AND/OR SOLID ACTIVE SUBSTANCES

CROSS-REFERENCE TO RELATED APPLICATIONS

This is a National Phase application pursuant to 37 C.F.R. § 371 of International Application No. PCT/EP2014/074182, claiming priority from German Application No. DE 10 2013 112 344.9 filed Nov. 10, 2013, the contents of which are incorporated herein by this reference.

FIELD OF THE INVENTION

The present invention relates to an apparatus for spreading liquid and/or solid active agents with the features of the independent claim 1. The invention furthermore relates to a method for controlling such an apparatus with the features of the independent method claim 9.

BACKGROUND OF THE INVENTION

Field sprayers and spray booms hitched to work machines, such as tractors, in some cases have very large working widths of more than 20 meters. Such wide spray booms are folded and collapsed in for transport purposes. In the field, symmetrical cantilevered arms of several meters length are located on both sides of the work machine, which cantilevered arms have a varying spacing from the ground according to surface conditions and field relief. Since the downward-directed nozzles for spreading a spraying agent, for example, a plant protection agent, which nozzles are arranged on the cantilevered arms, each have a defined spray cone, varying the spacing of the nozzles to the ground results in an uneven covering of the field with spraying agent. In addition, the danger of the spraying agent drifting greatly increases as the distance of the spray nozzles from the ground increases, since even slight air movements negatively affect the finely dispersed drops.

With increasing cantilever dimensions and the associated working width there is therefore a necessity to guide the spray boom at as uniform a spacing from the ground as possible, because minimal inclines of the spray boom will lead to large spacing differences of the nozzles to the ground.

In this context, it is known to suspend a spray boom from a carrier vehicle to be rotatable about at least one axis of rotation about a central pivot point. The rotation or pivot axis in this instance preferably runs parallel to the longitudinal axis of the carrier vehicle. In order to ensure an even spreading of the spraying agent, the spacing between the top surface of the growth and the spray nozzles must be constantly controlled to a defined spacing. On horizontal agricultural fields, this can generally be achieved by self-leveling, in which the spray boom aligns itself in the horizontal plane with the center of gravity of the spray boom being located below the central pivot point and the spray boom being suspended, for instance, to be freely and swingingly rotatable. The desired effect will not occur, however, for agricultural fields running along a slope.

In order to constantly control to a defined spacing the spacing between the top surface of the growth for agricultural fields running in any plane and the spray nozzles arranged on a spray boom pivotably suspended about a central pivot point, it is therefore known to pivot the spray boom, which is, for instance, raised to a desired spacing from the ground, about a pivot axis running through a central pivot point such that the spacing is optimized over the entire working width. For this purpose, an alignment changing torque has to be exerted on the spray boom about a pivot axis running through a central pivot point. This is carried out by means of at least one actuator, which transmits, at least as required, a force or a force couple affecting an alignment changing torque about a pivot axis from the carrier vehicle onto the spray boom in order to change the alignment of the spray boom.

This alignment changing torque accelerates the spray boom in a desired target rotational direction. Without countermeasures, the spray boom would continue to rotate about the pivot axis even after the impact of the alignment changing torque has ended, since the spray boom would retain its angular momentum due to the mass moment of inertia. In order to decelerate the spray boom, a braking torque in opposite to the previous alignment changing torque therefore has to be induced. This braking torque counteracts the rotary movement initiated by the alignment changing torque and thus damps the system of the spray boom, which is rotatably suspended about the central pivot point.

Up to now, mechanical dampers, which are arranged between the carrier vehicle and the spray boom, are usually used for generating the braking torque. If the carrier vehicle, however, rotates about the pivot axis due to bumps, for example, and the spray boom stands still, this will also result in a relative rotation between the carrier vehicle and the spray boom. A mechanical damper arranged between the carrier vehicle and the spray boom would counteract this relative rotation and thus transmit a torque, acting about the pivot axis, to the spray boom, such that a coupling exists between the carrier vehicle and the spray boom.

The coupling likewise exists if a measuring system is used as a basis for controlling the torque, which measuring system measures a relative angle and/or a relative rotation between the carrier vehicle and the spray boom.

In addition, measuring systems are known, which use tilt sensors arranged on the spray boom for determining the position of the spray boom. The angular velocity of the spray boom can be acquired independently of the carrier vehicle from the temporal derivation of the tilt. In the instance of lateral accelerations such as occur, for example, when driving along curves, tilt sensors however provide an incorrect tilt. Therefore, a calculation will also result in an incorrect angular velocity.

A spray boom that has a cantilever, which is put together from segments, is already known from the prior art. DE 32 02 569 A1 thus discloses a distribution machine, in which individual segments are connected to each other and the movement of the individual segments is effected passively. For this mechanism, a supporting element is necessary on the outer side of each of the cantilevers in order to enable the pivoting process. In order to prevent loss of harvest, it is however desirable to achieve an adjustment of the individual segments with regard to different ground contours without being in direct contact with the ground.

DE 18 33 453 U furthermore discloses a spray boom comprising nozzle trees, which are arranged on a cantilever by means of elastic elements. By the elastic elements, the nozzle trees can recover a vertical position even after a pivoting process of the cantilever. According to that document, the cantilever is arranged to be pivotable about only one axis, so that the spray boom possesses only a limited flexibility. Due to the high degree of irregularity of ground structures occurring in practice, spray booms with a greater flexibility are desirable in order to ensure an even distribution of the spray liquid on the soil.

A spreading apparatus for spreading liquid and/or solid active agents is known from DE 10 2007 025 751 A1. The spread apparatus comprises a spreading boom arranged on a self-propelled or towed vehicle, which spreading boom is mounted to be pivotable about a suspension point approximately parallel to a driving direction. The spread boom consists of a middle part and lateral cantilevered arms. The middle part is coupled with a frame section of the vehicle via at least one controllable actuating device. The actuating device induces a defined actuating power and/or a defined actuating torque between the middle part and the frame section for the purpose of pivoting the spreading boom relative to the frame section. Inducement is carried out independently of disturbance torques resulting from vehicle movements.

An automated spreading apparatus for spreading liquid and/or solid active agents, which is also referred to as an accompanying spreading apparatus, is known from FR 2 779 031 A1. The spread apparatus comprises a spreading boom arranged at a self-propelled or towed vehicle, which spreading boom is mounted to be pivotable about a suspension point approximately parallel to a driving direction. The spread boom consists of a middle part and lateral cantilevered arms. The middle part is coupled with a frame section of the vehicle via at least one controllable actuating device. Via at least two points of application, the actuating device induces at least two actuating forces between the middle part and the frame section for the purpose of pivoting the spreading boom within a vertical plane relative to the frame section. Inducement is carried out by overcoming the rotational inertia of the spreading boom and simultaneous reduction of disturbances by movements of its center of gravity. In the process, the center of gravity is shifted transversely to the driving direction within the vertical plane. A regulation causes the spreading boom to follow up. The actuating device can be designed as a screw spindle or as a hydraulic construction, for example.

A spreading apparatus for spreading liquid and/or solid active agents is known from FR 2 270 774 A1. The spread apparatus comprises a spreading boom arranged at a self-propelled or towed vehicle, which spreading boom is mounted to be approximately parallel to a driving direction. The spread boom, consisting of a middle part and lateral cantilevered arms, is connected to a vertical cylinder by means of two pins, with the vertical cylinder being arranged at a suspension point of a frame section to be pivotable about an axis parallel to the driving direction. The opposite end of the vertical cylinder is guided between two horizontal cylinders supporting themselves against the frame section. The vertical cylinder and thus the spread boom can be aligned parallel to the ground by actuating the horizontal cylinder. The spread apparatus provides two operating modes. One operating mode provides aligning the spread boom by a height adjustment of the vertical cylinder and by lateral tilting of the vertical cylinder by means of the horizontal cylinder. Another operating mode provides removing the lower pin in rough terrain such that the spread boom can swing freely.

An ultrasonic sensor controlled height control and position control for a spreading apparatus for spreading liquid and/or solid active agents is known from DE 41 40 254 A1.

The prevention of harmonic couplings in a spreading apparatus for spreading liquid and/or solid active agents is known from WO 2004/041446 A1, in which natural resonant frequencies of the cantilevered arms of a spreading boom, both in an empty state and in a full state of the lines and also during spraying operation, the resonance frequency of a rotary oscillation of the swingingly suspended spreading boom, the resonance frequency of a spring suspension of the vehicle to which the spreading apparatus is fastened, the resonance frequency of active agent sloshing in the tank provided for the agent, and the resonance frequency of an active agent pump are independent of each other. For this purpose, the cantilevered arms can be constructed to be adjustable in length.

Spreading apparatuses for spreading liquid and/or solid active agents are known from EP 0 157 592 A2. A first spreading apparatus provides a freely swinging suspension of a spreading boom with occasional correction processes taking place, in which the height of the spreading boom above the ground is readjusted according to a specified spacing between the cantilevered arms and the ground. A second spreading apparatus provides a fixed alignment of the spreading boom before, after, and during consecutive correction processes, in which the height of the spreading boom above the ground is readjusted according to a specified spacing between the cantilevered arms and the ground. A third spreading apparatus provides the spreading boom to be suspended passively and the passive suspension to be changeable at least with respect to one suspension property in order to effect a continuous change of alignment of the spreading boom. In this context, the continuous change is carried out slower than the self-stabilizing of the passive suspension.

SUMMARY

The object of the invention is to develop an apparatus, such as, for example, a field sprayer, for spreading liquid and/or solid active agents with a carrier vehicle and at least one boom with cantilevers projecting on both sides of the carrier vehicle, which boom is arranged pivotably about at least one pivot axis running preferably in parallel to a longitudinal axis of the carrier vehicle, which apparatus enables maintaining as precisely as possible the spacing of the cantilevers in relation to the ground surface, also in the instance of uneven ground and a moving or rolling carrier vehicle, as well as to specify a method for controlling such an apparatus, by means of which method it is made possible to maintain as precisely as possible the spacing of the cantilevers in relation to the ground surface, also in the instance of uneven ground and a moving or rolling carrier vehicle.

The object is in each case solved by the features of the independent claims.

Features of further advantageous developments of the invention are indicated in the dependent claims, in the following section with the general description, in the figures as well as in the corresponding section including the description of the figures.

A first object of the invention thus relates to an apparatus for spreading liquid and/or solid active agents. The apparatus comprises:
  a carrier vehicle;
  at least one boom arranged pivotably about at least one pivot axis;
  at least one sensor arrangement for detecting an angular velocity and/or an angular position of the boom about the pivot axis in relation to a reference plane and/or in relation to a ground surface;
  a control unit processing output signals of the at least one sensor arrangement to control signals, which control unit influences or, as the case may be, controls the spray boom in its angular position and/or in its angular velocity by means of at least two coupled control loops;

at least one actuator influencing the present angular position of the boom about the pivot axis based on control signals from the control unit;

where a desired value and/or a desired torque for the at least one actuator is generatable from the output signals of the at least one sensor arrangement by the control unit in an outer control loop;

and where an actual torque, which moves and/or influences the spray boom, and/or an actual value, which is based on actuator deflections and/or on control signals from the at least one actuator, is detectable in an inner control loop and is used for generating a correction value for achieving the desired torque and/or the desired value.

In this apparatus, the outer control loop can, in particular, generate a desired value from sensor data of the at least one sensor arrangement for the purpose of controlling the at least one actuator, which specifies a desired position for the spray boom. In addition, the inner control loop can typically take into account further sensor data, which are obtained in immediate connection with control signals of the at least one actuator and/or its detected interaction with the movably suspended spray boom. According to the structure of the apparatus, these further sensor data can be characterized and/or derived, in particular, by an adjustment torque induced into the boom by the actuator, which adjustment torque can be measured using further sensors, for example, or which can also be derived from the interaction of the actuator with the spray boom.

The necessary torque or the necessary actuating power, as the case may be, which is required in order to hold the boom in a target position or in order to bring it into a target position, can thus be determined within the outer control loop, for instance, by means of the information from the position sensors (ultrasonic sensors, for example) and/or angular rate sensors and/or acceleration sensors and/or angle sensors etc. This necessary torque or this necessary actuating power, as the case may be, typically has to be applied by the at least one actuator or by two or more present actuators, as the case may be, which are formed by a hydraulic or pneumatic cylinder, for example, or by electrically operating drives, or also by a plurality of such actuating cylinders.

The inner control loop, by contrast, controls the actual torque or the actual actuating power, as the case may be, which are actually induced into the boom by the actuating element or the actuator or the actuators, as the case may be, by means of the desired value specification (desired torque or desired actuating power) of the outer control loop. In the inner control loop, the actual torque can be determined, for example, from a product of a detected differential pressure for pneumatic actuating elements and a given lever length in relation to the pivot point of the spray boom. This product characterizes the required torque, which is to be induced into the spray boom. The actual torque can likewise be derived from a product of the spring deflection for hydraulic control and the given lever length in relation to the pivot point of the spray boom.

If the spray boom is located in a desired position, the corresponding desired value specification of the outer control loop is equal to zero. In this instance, the inner control loop also controls the actuating element or the actuator (or the actuators), as the case may be, such that the resulting actuating power is zero or the resulting torque is zero. In this instance, the actuating element thus exerts no influence on the boom, even when the carrier vehicle is crossing uneven terrain and is thereby carrying out rolling movements.

The actuating connection between the at least one actuator or actuating element, as the case may be, and the spray boom can, in particular, provide a spring bearing, where the spring can be formed by a mechanical spring arranged between the actuator and the spray boom or by a yielding medium, such as, for example, an elastomeric compound or the like in the actuator itself or in its bearing. The mechanical connection can connect the actuator, for example, which is guided at the spray boom in a slot, or the bearing of the actuating element to the spray boom.

As the case may be, however, it is possible to do without such a spring bearing, if the actuator and/or actuators used are actuators operating with fluidic pressure, preferably with pneumatic pressure. In this instance, the damping or the spring suspension, as the case may be, is carried out without inducing an actuating power by the compression of the air in the pressure chamber/chambers of the at least one actuator.

In particular, linear or rotary actuators operating with fluidic pressure can be employed as actuators or actuating elements, as the case may be. Such actuators can produce a controllable actuating connection between the carrier vehicle and the pivotable boom, where the at least one linear or rotary actuator has in each case one active pressure side, which is impingeable with fluidic actuating pressure, for each of the two adjustment directions of the boom. In addition, the actuators can be designed in such a manner that an approximately equal pressure level and/or force level is reached in the active pressure sides of two linear or rotary actuators operating in opposition or in the active pressure sides of a double-acting linear or rotary actuator, as the case may be, when the boom is stationary or moves only slightly in relation to the carrier vehicle, and where a defined differential pressure or a defined differential force is adjustable between the active pressure sides of the two linear or rotary actuators operating in opposition or between the active pressure sides of a double-acting linear or rotary actuator, as the case may be, when the boom is shifted in relation to the carrier vehicle.

In this instance, a correlation is preferably produced between the measured angles of rotation or the angular position of the boom, as the case may be, and the angular velocity by temporal integration of a measured value of the angular rate, referred to as angular velocity, from which the angle of rotation representing the angular position of the boom in relation to the reference plane can be determined. Disturbances caused by movements of the carrier vehicle or by translational accelerations of any kind have no influence on the calculation in this context, whereas measuring errors are likewise integrated and cause an angle drift of the angle of rotation. Although measurement of the angular position in relation to the reference plane, for instance, by measurement of the relative rotation between the carrier vehicle and the boom or measurement of a tilt angle relative to the acceleration of gravity, has the disadvantage of influences from disturbances caused by rotary movements of the carrier vehicle or by translational accelerations such as occur when driving along curves, for example, this is offset by the advantage that this type of detection of the angular position is not subject to any angle drift.

These measured values are most reasonably acquired in the apparatus according to the invention by at least one sensor arrangement for detecting the angular velocity and/or the angular position of the boom about the pivot axis in relation to the reference plane being formed by at least one angular rate sensor, rotational angular velocity sensor, and/ or angular acceleration sensor arranged on the boom. Optionally, the sensor arrangement can also be arranged on the carrier vehicle. It is also conceivable to use two such sensor arrangements on the boom and on the carrier vehicle.

The apparatus according to the invention can provide that the spray boom is mounted on an abutment part such as to swing about an axis, with an angular rate sensor (gyroscope) being mounted directly on and/or at the spray boom and/or at the carrier vehicle. The present position and the present motion of the boom in relation to a reference plane ("artificial horizon"), which are independent of the carrier vehicle, are determined by means of the gyroscope or by means of the mentioned sensor arrangement, as the case may be. In this way, it can be achieved that rotary movements or rolling movements of the carrier vehicle (self-propelled or towed field sprayer) do not immediately have a direct influence on the boom because the measured values determined by the gyroscope refer to the rotary movements of the boom in relation to the surface of the earth. In this manner, the sensor arrangement acquires absolute position values, which are excellently suited for detecting and either compensating or damping undesired swing motions and/or deflection motions of the boom.

The at least one actuator can be formed by at least one double-acting linear actuator operating with fluidic pressure, for example, which linear actuator produces an actuating connection between the carrier vehicle and the pivotable boom. In this context, a piston of the linear actuator, which piston is coupled with the boom and is movable in a cylinder chamber between two end positions, separates from each other two pressure chambers, which are in each case engageable by fluidic actuating pressure for each of the two adjustment directions of the boom. When the boom is stationary or moves only slightly in relation to the carrier vehicle, an approximately equal pressure level and/or force level prevails in these two pressure chambers, as can be preferably detected by means of suitable pressure sensors and evaluated in the control circuit together with the measured values from the sensor arrangement or from the angular rate sensor or gyroscope, as the case may be. If the boom is intended to move in relation to the carrier vehicle, however, the double-acting cylinder is engaged by actuating pressure such that a defined differential pressure and/or a defined differential force is adjustable between the two pressure chambers of the double-acting linear actuator when the boom is shifted or is to be adjusted in relation to the carrier vehicle.

In the instance of swinging suspensions, the proposed spray boom control can thus be carried out with at least one cylinder, for example, with which the spray boom can in each case be adjusted in relation to the pendulum swing. On the one hand, the cylinder is connected to the spray boom and, on the other hand, to the abutment part. The abutment part can also be part of a vehicle, a frame part of a plant protection sprayer, for example.

An alternative embodiment variant of the apparatus according to the invention can provide that the mentioned actuator is formed by at least two linear actuators operating in opposition and each operating with fluidic pressure, which linear actuators produce an actuating connection between the carrier vehicle and the pivotable boom, with each of the two linear actuators having one pressure chamber each, and with one of the two linear actuators being engaged in each case by fluidic actuating pressure for one specified adjustment direction of the boom. In this variant, too, an approximately equal pressure level prevails in the two pressure chambers of the two linear actuators when the boom is stationary or moves only slightly in relation to the carrier vehicle. If the boom, by contrast, is shifted or is to be adjusted in relation to the carrier vehicle, a defined differential pressure is adjustable between the two pressure chambers of the two linear actuators.

The mentioned cylinders, that is, the at least one double-acting cylinder or the at least two single-acting or double-acting cylinders, can be optionally engaged and operated with hydraulic or pneumatic pressure. As the case may be, hydropneumatic actuating devices are also conceivable. Electrically or electromotively operating linear actuators are conceivable, too, as the case may be.

The following aspects can be particularly pointed out as essential differences of the apparatus for spreading liquid and/or solid active agents according to the invention in comparison to the known spray apparatus:

The invention provides a spray boom, which is suspended at a support frame to be rotatable or swingable about a pivot axis approximately parallel to the vehicle axle. At least one preferably pneumatic actuating element (possibly also hydraulic) is additionally arranged between the spray boom and the support frame. The pressures are determined in each of the two cylinder chambers, for example, by means of suitable differential pressure sensors or also by a plurality of pressure sensors. As an alternative, strain gauges can be used on the piston rods or at connection points or the like.

During phases when no adjustment of the boom is necessary, the differential pressure or the resulting differential force, as the case may be, is regulated to approximately zero, so that no or no noteworthy force is induced into the boom. If it is necessary, however, to adjust the boom about its pivot axis due to the driving situation of the apparatus in uneven terrain or at a slope, for example, it is regulated to a defined differential pressure (differential force). The detection of the angular velocity can be carried out, in particular, via the gyroscope. The angle of rotation can be calculated by integration of the angular velocity.

In addition, slight rotary movements or rolling movements, as the case may be, are not immediately actively readjusted, and the damping of the boom can in this context be effected by air compression in the at least one pneumatic cylinder. Optionally, the connection between the cylinder and the boom can also be effected by means of an elastomer or by way of a slot with a corresponding spring or damping element.

The apparatus according to the invention enables precise and safe guidance of the spray boom over plant growth or a field, where the spray boom can be guided at a very small spacing relative to the ground or to the plant growth, if required. A precise adaptation of the boom to the field contour is possible by way of largely decoupling the boom from the suspension. In this way, negative wind and thermal influences on the drifting behavior of the spraying agent can be minimized. The apparatus according to the invention provides a very low-friction bearing for the spray boom, which can be mounted close to its center of gravity by means of ball bearings, for example, so that centrifugal forces as occur when driving along curves, for instance, have nearly no influence on the boom position. A control with outer and inner control loops is used in order to be able to adapt the boom to the respective terrain contour. In this manner, forces can be specifically induced into the boom without a permanent force-locking connection being required between the actuating elements and the spray boom. This can be achieved by at least one adjustment element following the movements of the carrier vehicle in real time or nearly in real time and by thus no disturbing forces being induced into the boom. When it is necessary to adapt the boom to the slope, for which purpose the boom has to be twisted in relation to the carrier vehicle, the actuating element pushes onto an elastomeric element or onto a springily suspended coupling point or the like in a defined, calculated travel and rotatingly accelerates the boom. Shortly before reaching the desired target position, an oppositely located elastomeric element or an oppositely located spring element is pushed and the rotary movement is decelerated. During this adjustment, the position of the actuating element—for instance, a double-acting actuating cylinder—is constantly measured and controlled so that the rolling movements of the machine can be compensated even during the adjustment. In order to be able to carry out these fast actuations, fast-acting proportional hydraulic valves are preferably used in the control circuits, which hydraulic valves are combined with the regulation circuitry and control circuitry according to the invention, with additional sensor data being processed by a gyroscope sensor system.

As already mentioned above, a double-acting cylinder, preferably a hydraulically operating cylinder, can be used instead of two pneumatic or hydraulic cylinders. A cylinder could thus be used that is impinged with pressure on both the side of the piston crown and the side of the piston rod. Again, a differential pressure between the side of the piston crown and the side of the piston rod could be measured here, where this cylinder can already have a differential pressure in the zero position due to the different cross sections. If the measured differential pressure, however, exceeds a defined value, the boom can again be actively readjusted. In this context, the boom is preferably regulated to a certain differential pressure based on the values specified by the gyroscope.

Alternatively to measuring the differential pressure, it is also conceivable to provide the at least one cylinder with a position sensor system so that movements of the boom can be determined not via a differential pressure, but rather via a length change of the actuating element. If this length change exceeds a defined value, the boom can be actively readjusted or the boom is regulated, as the case may be, to a certain length of the actuating element based on the values specified by the gyroscope.

A further alternative to measuring the differential pressure would be the use of at least one strain gauge, which is mounted on the piston rod of the at least one actuating element, for example. If there is no movement of the spray boom or if no active regulation is required, as the case may be, the strain gauge determines no or only a small traction force and/or compressive force, respectively. If a defined traction force or compressive force is exceeded, the boom can be actively readjusted or the boom is regulated, as the case may be, to a certain traction force and/or compressive force based on the values specified by the gyroscope.

In addition to the above described apparatus for spreading solid and/or liquid active agents, the present invention furthermore proposes a method with the features of the independent claim 9 in order to fulfill the above object. This method according to the invention serves, in particular, for controlling an apparatus according to one of the previously described embodiment variants and provides a control of the angular position of the boom arranged movably about a pivot axis on a carrier vehicle, namely a control by means of a multi-part control loop, which comprises at least one outer and one inner control loop. The control method provides a control of at least one actuating element or actuator for the torsion of the spray boom about a pivot axis, where an actuating power or an actuating torque is minimal and the actuator builds no or only a minimal actuating power between the carrier vehicle and the boom when the boom is stationary or moves only slightly out of its rest position;

and where a definable differential pressure and/or differential force is built up between the two pressure chambers for a boom that is to be adjusted;

where a present angular velocity and/or angular position of the boom about the pivot axis in relation to a reference plane is determined by means of at least one sensor arrangement, with sensors arranged on the boom or on the carrier vehicle comprising an angular rate sensor, a rotational angular velocity sensor, and/or an angular acceleration sensor, and/or distance sensors for detecting a spacing to the ground;

where a desired value and/or a desired torque for the at least one actuator is generated from the output signals of the at least one sensor arrangement by the control unit in an outer control loop;

and where an actual torque, which moves and/or influences the spray boom, and/or an actual value, which is based on actuator deflections and/or on control signals from the at least one actuator, is detectable in an inner control loop and is used for generating a correction value for achieving a desired torque and/or a desired value.

In this method, the outer control loop can, in particular, generate a desired value from sensor data of the at least one sensor arrangement for the purpose of controlling the at least one actuator, which specifies a desired position for the spray boom. In addition, the inner control loop can typically take into account further sensor data, which are obtained in immediate connection with control signals of the at least one actuator and/or its detected interaction with the movably suspended spray boom. According to the structure of the apparatus, these further sensor data can be characterized and/or derived, in particular, by an adjustment torque induced into the boom by the actuator, which adjustment torque can be measured using further sensors, for example, or which can also be derived from the interaction of the actuator with the spray boom.

The necessary torque or the necessary actuating power, as the case may be, which is required in order to hold the boom in a target position or in order to bring it into a target position, can thus be determined within the outer control loop, for instance, by means of the information from the position sensors (ultrasonic sensors, for example) and/or angular rate sensors and/or acceleration sensors and/or angle sensors etc. This necessary torque or this necessary actuating power, as the case may be, typically has to be applied by the at least one actuator or by two or more present actuators, as the case may be, which are formed by a hydraulic or pneumatic cylinder, for example, or also by a plurality of such actuating cylinders.

The inner control loop, by contrast, controls the actual torque or the actual actuating power, as the case may be, which are actually induced into the boom by the actuating element or the actuator or the actuators, as the case may be, by means of the desired value specification (desired torque or desired actuating power) of the outer control loop. In the inner control loop, the actual torque can be determined, for example, from a product of a detected differential pressure for pneumatic actuating elements and a given lever length in relation to the pivot point of the spray boom. This product characterizes the required torque, which is to be induced into the spray boom. The actual torque can likewise be derived from a product of the spring deflection for hydraulic control and the given lever length in relation to the pivot point of the spray boom.

If the spray boom is located in a desired position, the corresponding desired value specification of the outer control loop is equal to zero. In this instance, the inner control loop also controls the actuating element or the actuator (or the actuators), as the case may be, such that the resulting actuating power is zero or the resulting torque is zero. In this instance, the actuating element thus exerts no influence on the boom, even when the carrier vehicle is crossing uneven terrain and is thereby carrying out rolling movements.

The control loops are preferably connected to each other or switched such that the outer control loop overrides the inner control loop, as the outer control loop carries out the desired pivoting movements of the spray boom, whereas the inner control loop is primarily intended to prevent undesired actuating forces from influencing the boom.

It should be additionally emphasized here that all aspects of the invention as explained above by means of the apparatus for spreading liquid and/or solid active agents and its embodiment variants are intended to apply likewise to the control method and/or regulating method according to the invention for the adjustment of the position of the spray boom of the described apparatus.

In one variant of the method, both the measurement data of the at least one sensor arrangement and the differential pressures between the two pressure chambers of the at least one actuator are used for determining a present angular position and/or a desired angular position between the boom and the carrier vehicle and are processed by a control unit, which controls the at least one actuator based on these measurement data, which actuator changes the boom position in the desired manner such that the boom, in particular, retains or assumes, as the case may be, its horizontal position when the ground is even or its position parallel to an inclined ground, as the case may be.

Additionally, it should be noted here that the distribution apparatus according to the invention can preferably be an agricultural distribution machine, in particular a field sprayer for spreading liquid plant protection products and/or fertilizers, and also solid active agents, as the case may be, which can be spread in an atomized form, for example. The field sprayer can be designed, for example, as a self-propelled machine or as a machine arranged at a towing vehicle or hitched onto it, as the case may be. Normally, the field sprayer essentially consists of a frame for carrying the individual assemblies, a storage vessel for carrying along the spray liquid to be spread, a computer unit for controlling the individual machine elements as well as a distribution apparatus or spray boom, as the case may be, extending transversely to the driving direction, which distribution device or spray boom is height adjustable in relation to the frame by means of actuating elements and rotatable about a horizontal longitudinal axis. A plurality of so-called nozzle holders is arranged evenly spaced apart on the distribution apparatus. Mounted at these nozzle holders, in turn, is at least one spray nozzle, however, as a rule, a plurality of spray nozzles for distributing the plant protection liquid and/or the fertilizing liquid. For this purpose, the spray nozzles produce a spray cone, which is directed toward the plant growth. The control of the actuating elements for the height adjustment and for controlling the desired nozzle holders or spray nozzles, as the case may be, is carried out, in particular, by way of spreading patterns or spreading profiles, as the case may be, which are stored in a computer system.

Preferably, a suitable angular rate sensor or also a plurality of angular rate sensors, which is/are mounted directly on the boom, can be used for detecting the angular velocity in the apparatus according to the invention. Rotary movements of the carrier vehicle thus have no influence on determining the angular velocity of the boom. An output signal of an angular rate sensor, which output signal is proportional to the measurand or reflects it, thus corresponds to the rotary movement of the boom in relation to any optional reference plane, for example in relation to the surface of the earth or to a long-term alignment of the carrier vehicle reflecting an averaged ground profile.

This measurand or, as the case may be, an output signal of an angular rate sensor detecting the angular velocities of the boom, which output signal is integrated into the control signals to the actuator or actuators and serves as an input variable for the control unit, and which output signal is proportional to this measurand or reflects it, can be used for the purpose of obtaining an active damping of the boom in the form of an actively induced brake torque.

Alternatively or additionally, the at least one sensor arrangement for detecting an angular velocity of the boom about the pivot axis in relation to a reference plane can comprise at least one angular rate sensor arranged on the carrier vehicle for the purpose of measuring angular velocities of the carrier vehicle at least about its longitudinal axis and thus measuring rotary movements representing disturbances of the carrier vehicle. This means that an additional angular rate sensor can optionally also be employed at the carrier vehicle, thus enabling a comparison of the measured values for an even better position determination and/or angle determination of the boom.

Additionally, the at least one sensor arrangement for detecting an angular velocity of the boom about the pivot axis in relation to a reference plane can in this instance comprise at least one angle of rotation sensor or rotational angular velocity sensor, which detects the relative rotation between the carrier vehicle and the boom, such that the absolute angular velocity of the boom about the pivot axis can then be determined from the two measured values of the angular velocity of the carrier vehicle in relation to its longitudinal axis and the relative rotation between the carrier vehicle and the boom.

Alternatively or in addition to an angular rate sensor, the at least one sensor arrangement for detecting an angular velocity of the boom about the pivot axis in relation to a reference plane can comprise an angular acceleration sensor. A measure for the angular velocity can be obtained by temporal integration of this sensor output signal.

In summary, it is thus understood that the means for determining an angular velocity of the boom about the pivot axis in relation to a reference plane can comprise one or a plurality of inertial sensors arranged on the boom.

Inertial sensors serve for measuring accelerations and angular rates. By combining a plurality of inertial sensors in an inertial measurement unit, also referred to as IMU, accelerations can be measured in up to six degrees of freedom that a rigid body can have (three translational and three rotational degrees of freedom). An IMU is the main component of an inertial navigation system, also referred to as INS.

Examples of inertial sensors are acceleration sensors and angular rate sensors.

An angular rate sensor detects the rotational speed or angular velocity, as the case may be, of a body about a specified rotation axis or pivoting axis, with an output signal of an angular rate sensor being preferably uniquely proportional to a detected angular velocity.

By integration of the angular velocity over a time interval, it is possible to derive the angle by which the body has rotated in that time interval. The angular rates about the three spatial axes are termed as:
  yaw rate (rotation about the vertical axis),
  pitch rate (rotation about the lateral axis), and
  roll rate (rotation about the longitudinal axis).

The measuring principle is essentially based on two measuring principles, on the one hand on the Coriolis force, which acts on a mechanically moving system, and on the other hand on the Sagnac effect, which can be observed with light.

Examples of mechanical, moving systems using the Coriolis force are:
  Foucault pendulum;
  gyrocompass;
  dynamically tuned gyroscope (DTG), measurement error <1°/h;
  vibrating structure gyroscope, measurement error <10°/h; and
  halteres.

Examples of optical systems using the Sagnac effect are:
  ring laser gyroscope (RLG), measurement error <0.001°/h;
  fiber optic gyroscope (FOG), measurement error <1°/h.

As a rule, inertial measurement units contain the following sensor types:
  Three orthogonally arranged acceleration sensors (also referred to as translational sensors) detect the linear acceleration in the x or y or z axis, respectively. From this, the translational movement can be calculated by double integration.
  Three orthogonally arranged angular rate sensors (also referred to as gyroscopic sensors) measure the angular velocity about the x or y or z axis, respectively. From this, the rotational motion can be calculated by single integration.
  Magnetic field sensors, for example, such as compass sensors, can be additionally provided for determining the constant of integration and/or for improving the accuracy and/or and or for correcting a drift of the sensors, and/or for receiving signals from an existing and/or from a future global navigation satellite system, also abbreviated as GNSS, such as:
    GPS (Global Positioning System) of the United States of America, and/or
    GLONASS (GLObal NAvigation Satellite System) of the Russian Federation, and/or
    Galileo of the European Union, and/or
    BeiDou of the People's Republic of China.

The at least one sensor arrangement for detecting an angular position of the boom about the pivot axis in relation to the reference plane can comprise at least one sensor, which detects a relative rotation between the carrier vehicle and the boom in relation to the pivot axis.

At least one sensor for detecting a relative rotation between the carrier vehicle and the boom can be an angle of rotation sensor arranged between the boom and the carrier vehicle.

Alternatively or additionally, detection of a relative rotation between the carrier vehicle and the boom can be realized by means of at least one tilt sensor, which detects an angle between the carrier vehicle and the reference plane, and by means of at least one tilt sensor, which detects an angle between the boom and the reference plane, where the difference of the angle between the carrier vehicle and the reference plane and the angle between the boom and the reference plane, as detected by the sensors, is proportional to the relative rotation between the carrier vehicle and the boom.

The invention allows a very accurate determination of a present angular position of the boom in relation to a reference plane. In comparison to determining the angular position by means of a plurality of ultrasonic sensors, this is less elaborate and less cost-intensive.

In addition, the apparatus can comprise an actuator influencing an average spacing of the boom in relation to the ground or to the growth based on control signals from the control unit, for example in the form of one or a plurality of hydraulic cylinders, which actuator converts control signals into mechanical motion or into another physical quantity, such as, for instance, pressure, and thus exerts a force on the boom, which force raises or lowers the boom.

Furthermore, the apparatus can comprise at least one sensor arrangement for detecting at least one average distance of the boom in relation to the ground or to the growth. Preferably, such a sensor arrangement comprises at least one distance sensor arranged on at least one end of a cantilever of the boom. By means of this distance sensor, which is arranged on at least one end of the cantilevers of the boom, and by means of an appropriate consideration of its output signals in producing control signals by means of the control unit, it is possible to increase the reliability with which it can be prevented that the boom or the spreading means for solid and/or liquid active agents arranged thereat, such as, for example, spray nozzles, come into contact with the ground and/or with the growth.

Alternatively or additionally, such a sensor arrangement can comprise at least one distance sensor arranged at the part of the boom not projecting beyond the width of the carrier vehicle.

By way of the distance signals of the sensors, the control unit can produce control signals provided for the at least one actuator to influence at least one average distance of the boom in relation to the ground or to the growth.

In order to exclude influences from uneven mass distributions of the boom as far as possible, the pivot axis preferably runs through the center of gravity of the boom.

The at least one boom can be arranged on the carrier vehicle in a permanent manner or so as to be exchangeable for another device for agricultural soil treatment and/or growth treatment.

In this context, the carrier vehicle can be driven or towed such that the apparatus:
  forms a self-propelled agricultural unit or an agricultural self-drive unit, as the case may be, in the instance of a driven carrier vehicle with a permanently arranged boom;
  forms a towed agricultural unit, such as, for example, an agricultural trailer, in the instance of a towed carrier vehicle with a permanently arranged boom; and
  forms either an attachment unit or a mounting unit in the instance of a driven carrier vehicle with a boom that is arranged so as to be exchangeable for another device for agricultural soil treatment and/or growth treatment, for example at a three-point hitch or on a loading platform provided for this purpose.

Additional advantages in comparison to the prior art over and above those already mentioned will result from completely solving the proposed task together with the remedy of any disadvantages of the prior art.

Moreover, it is reliably prevented that the cantilevers come into contact with the ground by precisely maintaining the distances of the cantilevers in relation to the ground surface and/or to the growth, independently of the moving and/or rolling carrier vehicle.

All of the mentioned measurement data provided by the acceleration sensors and/or by the gyroscopes or other such measurement arrangements are preferably checked against the measured values for pressure, force, and/or strain from the at least one actuating element, which is arranged between the boom and the carrier vehicle, and which preferably provides no differential pressure or no or only low force values, as the case may be, in the instance of a stationary boom.

BRIEF DESCRIPTION OF THE DRAWINGS

In the following passages, the attached figures further illustrate exemplary embodiments of the invention and its advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIG. 3A is a schematic view showing a first embodiment of a boom adjustment assembly at the carrier vehicle and FIG. 3B is a schematic view showing a second embodiment of the boom adjustment assembly.

FIG. 4 shows a schematic detailed view of a linkage of an actuating element to the spray boom.

FIGS. 7A-7D show some of the most important components for adjusting the boom linked to the carrier vehicle and their circuitry in inner and outer control loops in four further schematic block diagrams.

FIG. 8 in turn shows an outer control loop of the boom adjustment in a schematic block diagram.

DETAILED DESCRIPTION

Figure 1:
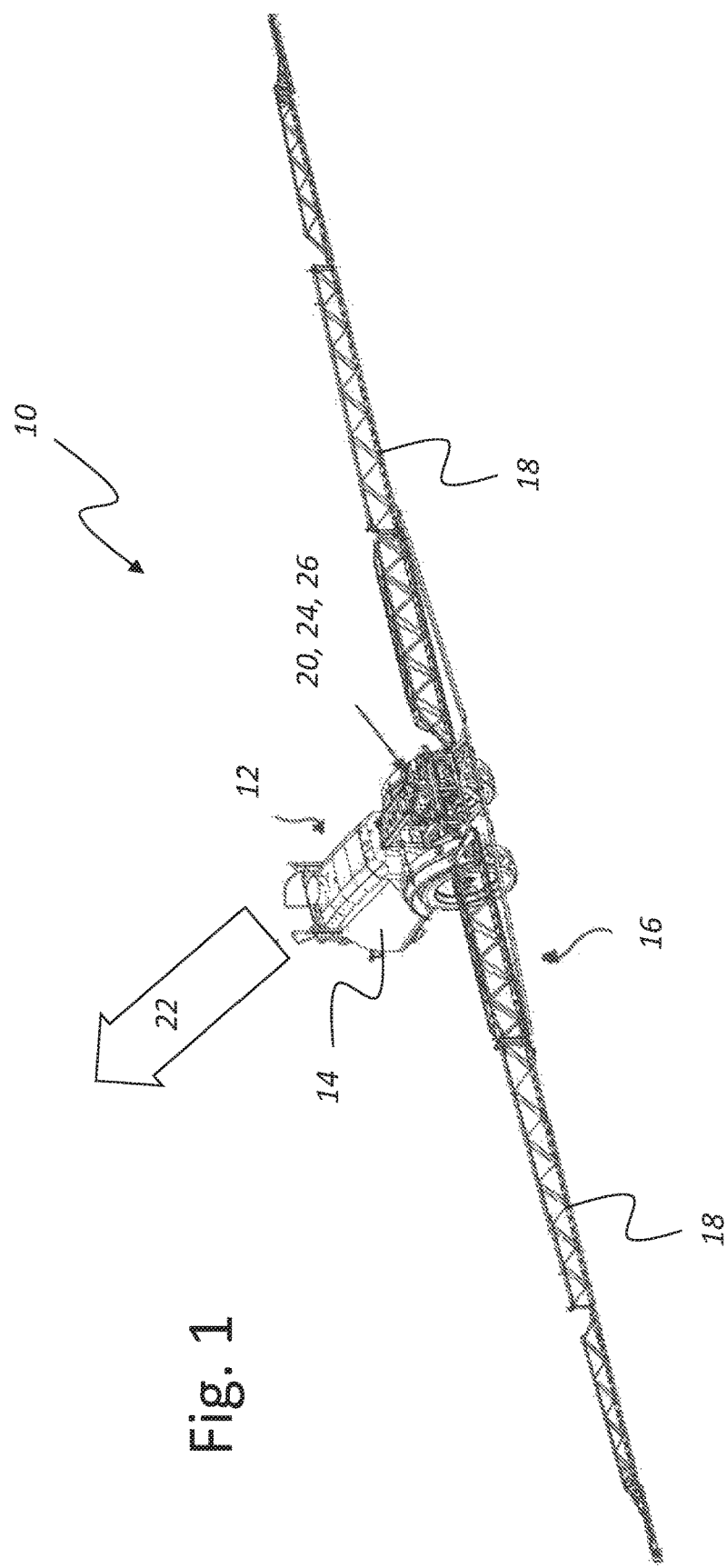
FIG. 1 shows a schematic perspective view of an embodiment variant of an agricultural distribution apparatus formed by an agricultural carrier vehicle, which is equipped with a spray boom.
Figure 2:
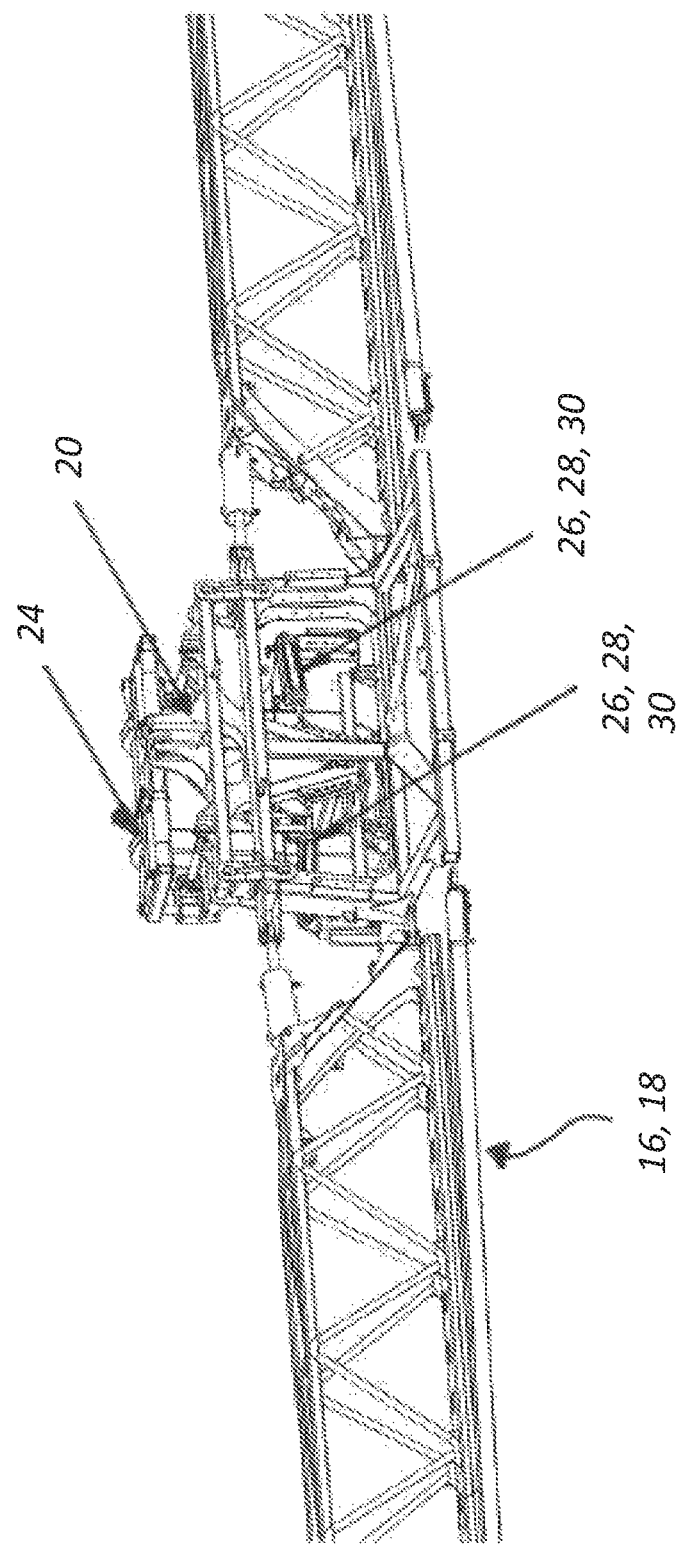
FIG. 2 shows a detailed view of a suspension of the boom at the carrier vehicle.

The same or equivalent elements of the invention are designated by identical reference characters. Furthermore and for the sake of clarity, only the reference characters relevant for describing the respective figure are provided. It should be understood that the detailed description and specific examples of the apparatus or of the method according to the invention are intended for purposes of illustration only and are not intended to limit the scope of the invention.

The schematic perspective view in FIG. 1 shows a conceivable embodiment variant of an agricultural distribution apparatus 10 formed by a towed agricultural carrier vehicle 12 with a tank 14 for a spreading liquid and with a spray boom 16 suspended at the rear end, which spray boom 16 has two symmetrically designed cantilevered arms 18, which are equipped with nozzle holders, which are not discernible here, and with spray nozzles integrated therein for atomizing the spreading liquid, for example, the spraying agent. On the one hand, the suspension 20 of the spray boom 16 at the frame enables torsion of the boom 16 about an horizontal longitudinal axis, which is oriented in parallel to the driving direction 22, and on the other hand allows the boom 16 to be horizontally aligned or aligned in parallel to the ground surface, as the case may be, when the suspension 20 twists or moves in any manner, in particular due to bumps, uneven terrain, etc.

As the detailed view of FIG. 2 shows, the boom 16, which is suspended to swing or rotate, as the case may be, about the pivot axis (parallel to the driving direction 22) at the suspension 20 at the carrier frame 24 of the carrier vehicle 12, is coupled with the carrier frame 24 by pneumatic or hydraulic actuating elements 26. In the exemplary embodiment shown here, the actuating elements 26 are formed by two separate hydraulic or pneumatic linear cylinders 28 operating in opposition, which can each be associated with pressure sensors 30 and/or position sensors. In the two pressure chambers of the actuating cylinders 28, the pressures can in each case be detected by means of pressure sensors 30 (a differential pressure sensor or two pressure sensors); as the case may be, the motion difference or length difference of the extending and shortening actuating element 26 can also be detected by means of the position sensors or also by means of strain gauges on the piston rods or at their connections to the boom 16 and/or at the suspension 20.

The schematic illustrations of FIGS. 3A and 3B show various embodiment variants of the linkage of the actuating element 26 or, as the case may be, of the sensor system 32 being in connection hereto for the purpose of controlling it. The sensor device 32, which is merely indicated in FIG. 3A, provides an output signal 34 to a control unit and/or regulating unit 36, which in addition processes sensor signals or desired value signals 38*a* and 38*b*, as the case may be, from at least two distance sensors 40, which are to be understood as optional, and which are each arranged at the cantilevered arms 18 and which each provide signal values for a measured spacing of the cantilevered arms 18 to the ground 42. These distance sensors 40 can be formed by ultrasonic sensors, for example, or by optical sensors or the like. Based on the sensor signals 38*a* and 38*b* and on the output signal 34 of the sensor device 32, the control unit and/or regulating unit 36 generates an actuating signal 44 for the actuating element 26, which can be controlled in such a manner that the mechanical connection between the linkage 46 to the spray boom 16 and the vehicle-fixed suspension 20 can be maintained nearly free of actuating power and free of torque moments. The actuating signal 44 in this instance forms a desired signal within the outer control loop, which is explained in more detail by means of the FIGS. 6A to 8.

In the embodiment variant shown in FIG. 3A, the actuating element 26 is formed by a double-acting hydraulic cylinder 28, the piston rod 48, which ends in a bolt 50, which is mounted largely without play in the linkage 46 at the middle part 52 of the spray boom 16, which middle part 52 connects the two symmetrical cantilevered arms 18. Optionally, this linkage 46 can be equipped with a suitable force sensor 32*a*, which detects the forces transmitted by way of the bolt 50, generates a first output signal 34*a* therefrom and thereby maintains the mechanical connection between the bearing or suspension 20, as the case may be, and the linkage 46 nearly force-free and torque-free by means of suitable control of the actuating element 26 via the actuating signal 44 generated in the control unit and/or regulating unit 36 when the spray boom 16 or, as the case may be, its middle part 52 is twisted about the pivot axis 54, which is statically arranged at the carrier vehicle, as is the suspension 20, too.

Alternatively or additionally, a strain sensor 32b or a suitable force sensor or the like can be arranged on the piston rod 48 or in another suitable place, which sensor 32b detects the tension forces and/or strain forces acting on the piston rod 48, generates a second output signal 34b therefrom, and in this manner can maintain the mechanical connection between the bearing 20 and the linkage 46 nearly force-free and torque-free by means of suitable control of the actuating element 26 via the actuating signal 44 generated in the control unit and/or regulating unit 36.

Furthermore, a tilt sensor or, as the case may be, an acceleration sensor 56 or gyroscope can be arranged on the boom 16, in particular on its middle part 52, the signals of which sensor 56 can be additionally analyzed in the unit 36 in order to obtain a useful actuating signal 44 therefrom in connection with the further mentioned sensor values.

Figure 3B:
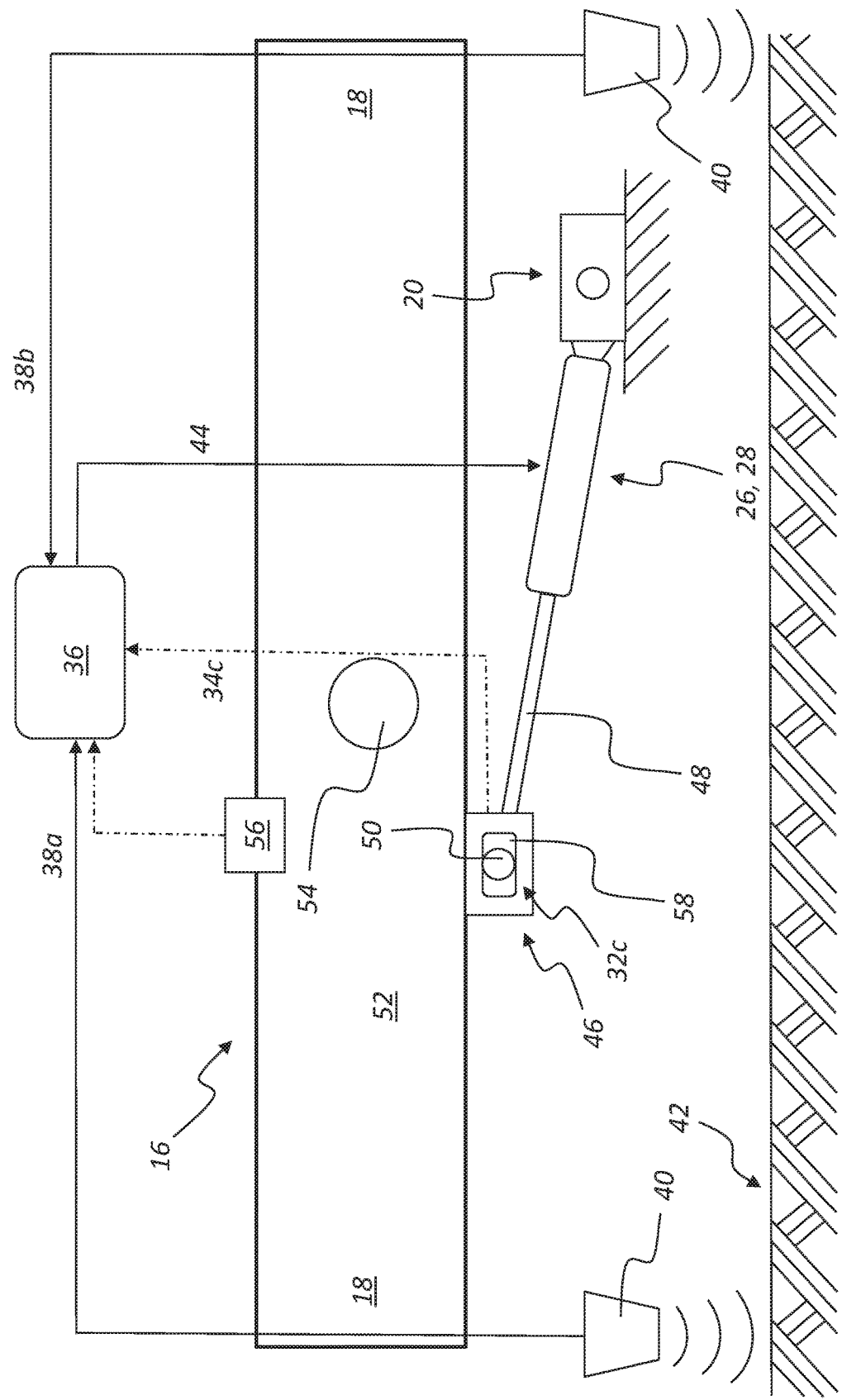

Further variants are conceivable and usefully realizable for detecting the actuating forces and/or actuations between the middle part 52 of the spray boom or spreading boom 16 and the vehicle-fixed bearing 20, that is, the frame of the vehicle, which is not illustrated in the FIGS. 3A and 3B. For instance, the sensor system can also be formed by suitable pressure sensors, which are arranged in the pressure fluid circuit of the actuating element 26 and detect changes of the hydraulic or pneumatic pressure, for example, or which are arranged in the area of the actuating element 26, of the hydraulic cylinder 28, and/or of its pressure lines and detect pressure fluctuations, which result from relative movement between the spray boom or spreading boom 16 and the vehicle in the instance of pivoting motions about the suspension point 54. With such an optional pressure sensor system, it can be useful to take into account by way of component parameters the frictional effects, which are due to sliding motions of the piston rod 48 along hydraulic seals, for example. Such parameters can be assigned to the largely standardized components, which are normally used as actuating elements 26, such that the frictional proportions and frictional effects, which are superimposed upon the measured pressure values, are known with sufficient precision and can be taken into account and eliminated in the force calculations.

In the embodiment variant shown in FIG. 3B, the actuating element 26 is formed by a double-acting hydraulic cylinder 28, the piston rod 48 of which ends in a bolt 50, which is mounted in a slot 58 in the linkage 46 at the middle part 52. Optionally, this linkage 46 can be equipped with a suitable optical and/or mechanical position sensor 32c, which detects the small deflections of the bolt 50 in the slot 58, generates a third output signal 34c therefrom, and thus maintains the mechanical connection between the bearing 20 and the linkage 46 nearly force-free and torque-free by means of suitable control of the actuating element 26 via the actuating signal 44 generated in the control unit and/or regulating unit 36. The remaining structure of the variant shown in FIG. 3B with the two distance sensors 40 and further components, such as, in particular, the tilt sensor or acceleration sensor 56 or, as the case may be, the gyroscope, which is mounted on the middle part 52, can correspond to the embodiment illustrated in FIG. 3A. Further sensor types can of course by employed as position sensors 32c, for example, inductive sensors or rotation detection sensors or the like.

Based on the signals 34 and 38, the control unit and/or regulating unit 36 generates an actuating signal 44 for a pressure supply unit, which is not illustrated here and which is in connection with the hydraulic cylinder 28. Only the very quickly operating real-time control by way of the actuating signals 44 can provide the desired force freedom or torque freedom of the mechanical connection by the actuating element 26. The control mechanism for the actuating element 26 readjusts said actuating element 26 or, as the case may be, the double-acting hydraulic cylinder 28 largely delay-free following all deflections of the vehicle in relation to the middle part 52 about the pivot bearing 54 in the suspension point. The spray boom or spreading boom 16 normally does not carry out any independent reactive motions due to vehicle movements, but rather tends not to follow the vehicle movements and to remain largely static and in rest during all vehicle movements. However, in order to reliably suppress any undesired reactive motions of the spray boom or spreading boom 16, the piston rod 48 of the hydraulic cylinder 28 follows nearly delay-free all relative movements of the vehicle in relation to the spray boom or spreading boom 16, in which a pivoting motion about the pivot bearing 54 is carried out such that the piston rod 48 of the hydraulic cylinder 28 is moved by way of the linkage 46.

This quasi "real-time" control is thus able to readjust the cylinder 28 to all deflections, but at the same time does not induce any noteworthy forces from the vehicle into the middle part 52. The control is based on the forces and/or displacements being detected in the linkage 46 and being largely delay-free readjusted such that, despite the mechanical connection via the actuating element 26, the spray boom or spreading boom 16 remains approximately in the previously adjusted position, independent of the motions and swaying movements building up with the towing vehicle or carrier vehicle driving along the ground 42. The control mechanism thus provides for an active adjustment control to counter the rolling movements of the vehicle.

Furthermore, the schematic drawing of FIG. 4 illustrates the play-afflicted bearing of the bolt 50, which is connected with the piston rod 48 of the actuating element 26 formed as linear actuator, in the slot 58 of the linkage 46, which is connected to the middle part 52. On both sides of the bolt 50 are power transmission means, such as for instance the illustrated pressure springs 60, which provide support for the bolt 50 in the slot 58. In addition, the position of the bolt 50 in the slot 58 is detected by means of a suitable sensor (e.g. sensor 32c; cf. FIG. 3B).

The slot 58 is an element that is fixedly connected to the spray boom 16. The counterpart or, as the case may be, the piston rod 48 of the actuator 26 (e.g. hydraulic cylinder, pneumatic cylinder, other linear actuator, etc.) is fixedly connected with the slot 58 and with the actuator 26 of the carrier vehicle to the abutment part 20 (cf. FIG. 3). Both parts are coupled by means of the two springs 60 or other elastic elements, which are located between the connection means or the bolt 50 and the slot 58. These springs 60 can, but need not, be mechanical; elastomers or the like are also conceivable. For the purpose of coupling, it would also be conceivable to arrange an additional lever, which is likewise assigned spring elements, between the actuator 26 and the spray boom 16. In the shown exemplary embodiment, the spring elements 60 are in each case arranged such that the two forces, that is, the forces acting in the longitudinal direction of the slot 58, are neutralized when the connection means or the bolt 50 is located in the central position of the slot 58; the lever is then in center position. When the connection means 50 is located outside of the center position of the slot 58 or, as the case may be, when the lever is located outside of the center, a force based on the respective deflection position is transmitted in correspondence to the spring characteristic curve. The deflection position can thus be converted to an induced force by way of the spring characteristic curve, or, as the case may be, it can be converted to a torque by way of a defined lever arm.

Conversely, this means: In order to induce a certain torque, a desired deflection of the spring 60 or of the lever can be calculated by way of the spring characteristic curve and the lever arm. This desired deflection is then adjusted by a very quickly operating control loop, which measures the position of the connection means 50 in relation to the slot 58 or measures the lever position for a reference value, and which controls the cylinder 28 according to the difference between desired deflection and measured deflection. This control represents the inner control loop according to the present definition.

The inner control loop also compensates for rolling movements of the carrier vehicle by always operating and constantly maintaining the deflection of the springs 60 and of the lever at the desired value. This desired value is specified by an outer control loop. The desired torque is thus the actuator of the outer control loop. The outer control loop controls this desired torque based on the position and motion of the boom 16, on the detected spacings between the boom 16 and the ground 42, and based on specifications from the operator.

Figure 5:
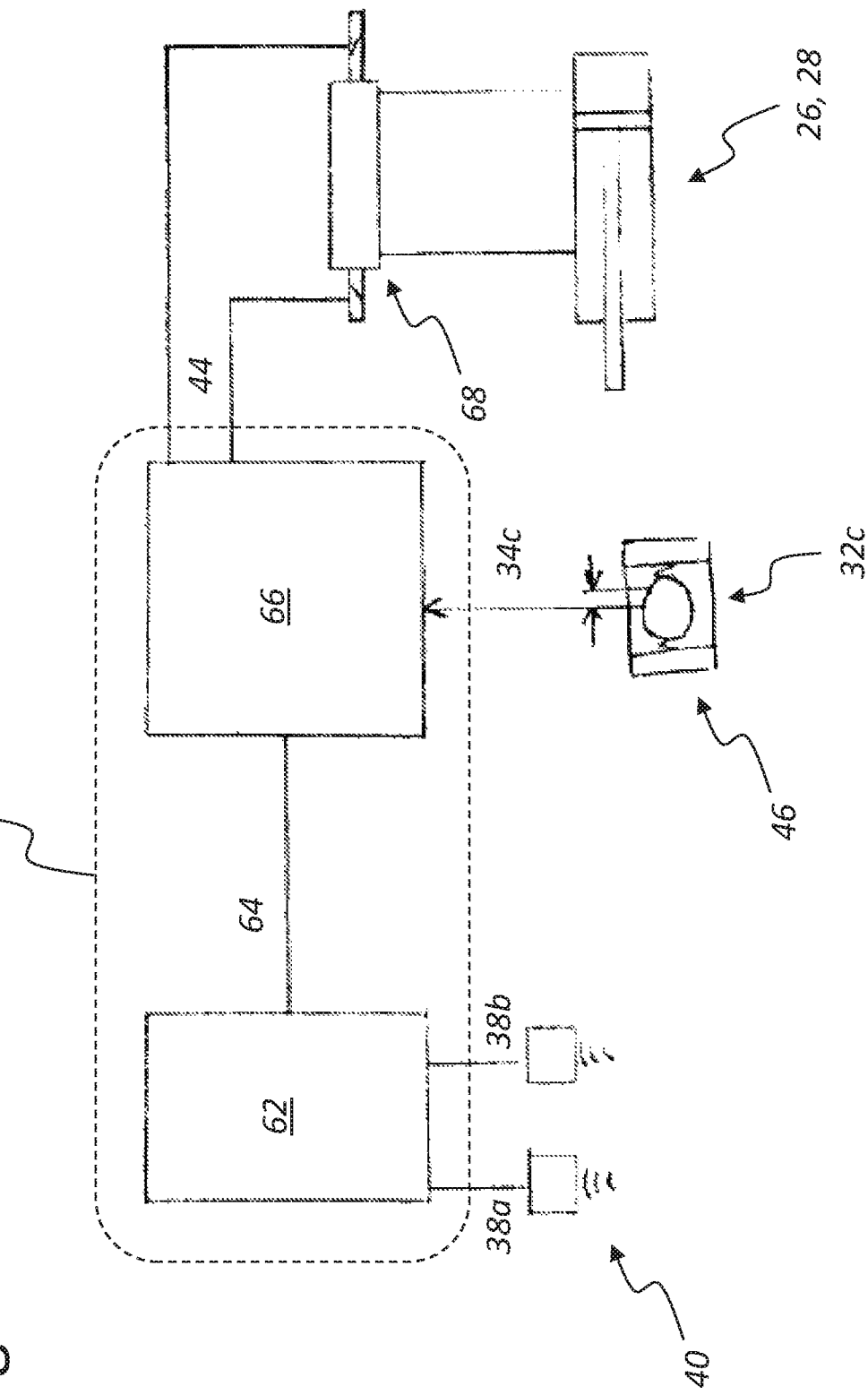
FIG. 5 shows an inner and an outer control loop for controlling an actuating element for the spray boom in a block diagram.

This connection is once more schematically illustrated in FIG. 5. The two distance sensors 40, for example, which are arranged on the cantilevered arms 18 of the spray boom 16, thus provide the measured values 38a and 38b to the control unit and/or regulating unit 36, which generates a desired signal 64 from these measured values in its outer control loop 62, which desired signal 64 is provided to the inner control loop 66. This inner control loop 66 in addition processes the sensor signal 34c of the sensor 32c, which detects the deflection of the bolt 50 in the slot 58 in the area of the linkage 46 (cf. FIG. 4). Based on this desired signal 64 and on the sensor signal 34c, the inner control loop 66 of the circuit 36 forms suitable control signals or actuating signals 44 for a hydraulic pressure supply 68, which supplies actuating pressure to the actuating element 26 or to the double-acting hydraulic cylinder 28, as the case may be.

As long as no control is carried out, the inner control loop 66 is active and operates such that no actuating forces are generated by the actuating element 26. If the boom 16 is intended to be adjusted, both the inner control loop 66 and the outer control loop 62 are set to work, with the inner control loop 66 in each case overriding the outer control loop 62, where this override could also be carried out in the reverse manner, as the case may be, that is, such that the outer control loop 62 overrides the inner control loop 66.

Figure 6A:
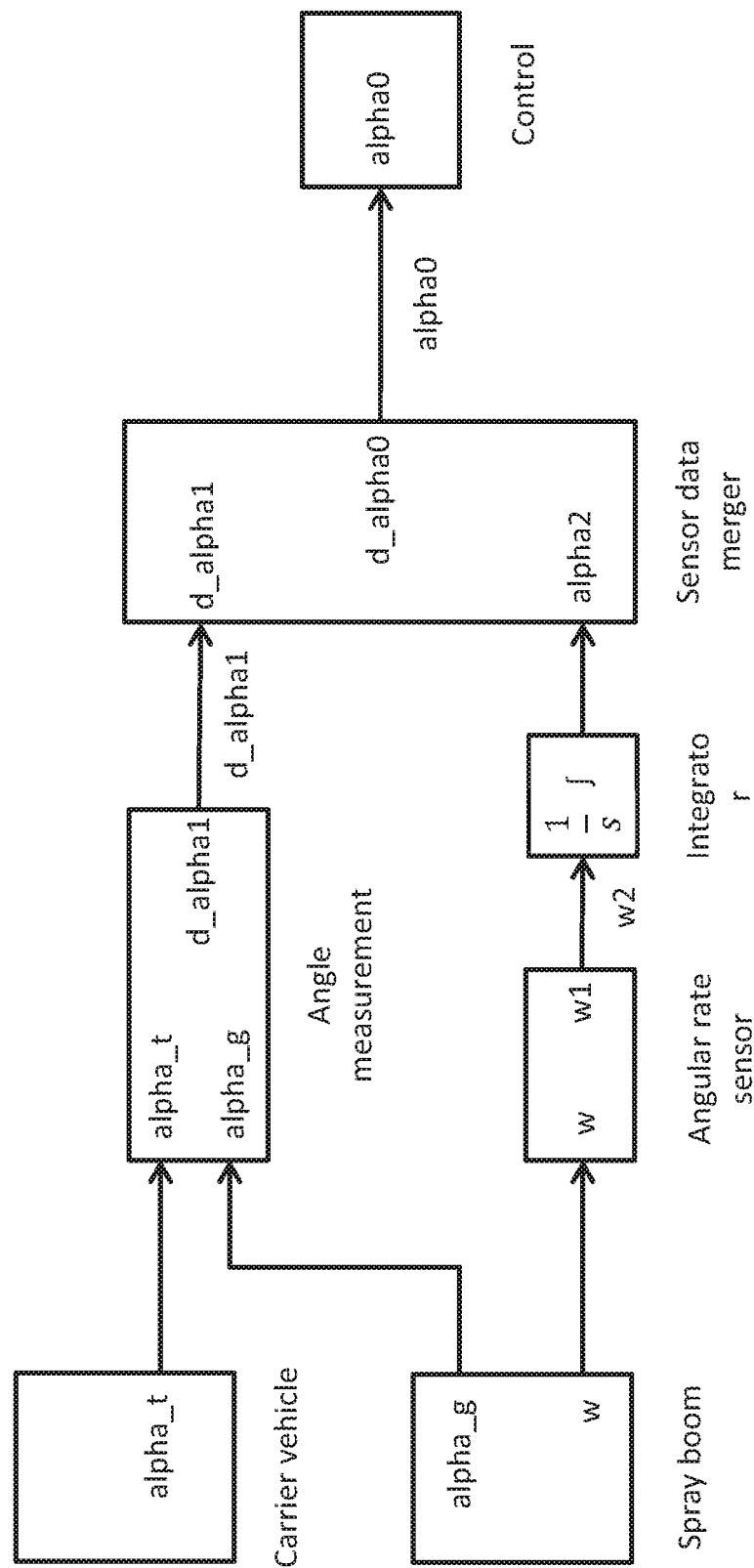
FIGS. 6A and 6B show some important components for adjusting the boom linked to the carrier vehicle and their circuitry in schematic block diagrams.

The schematic block diagrams of FIG. 6 show some important components for adjusting the boom linked to the carrier vehicle and their circuitry. FIG. 6A thus illustrates an exemplary embodiment for obtaining sensor data that can be used for controlling the positioning of the spray boom. The reference plane here is the long-term angular alignment of the carrier vehicle. In this circuit, the tilt angle alpha_t of the carrier vehicle in relation to the horizontal is detected at the carrier vehicle and supplied into a module for angle measurement. In addition, a tilt angle alpha_g of the spray boom in relation to the horizontal is measured, and this value is also provided to the module for angle measurement, where a differential angle d_alpha1 between the carrier vehicle and the spray boom is calculated herefrom. Furthermore, the angular velocity w at the spray boom is detected by means of an angular rate sensor, which is carried out independently of all superimposed rotary movements of the carrier vehicle. An angle alpha2 is calculated by integration from the values from the angular rate sensor. In the sensor data merger, a filtered angle alpha0 is calculated herefrom, which is used for the control.

Figure 6B:
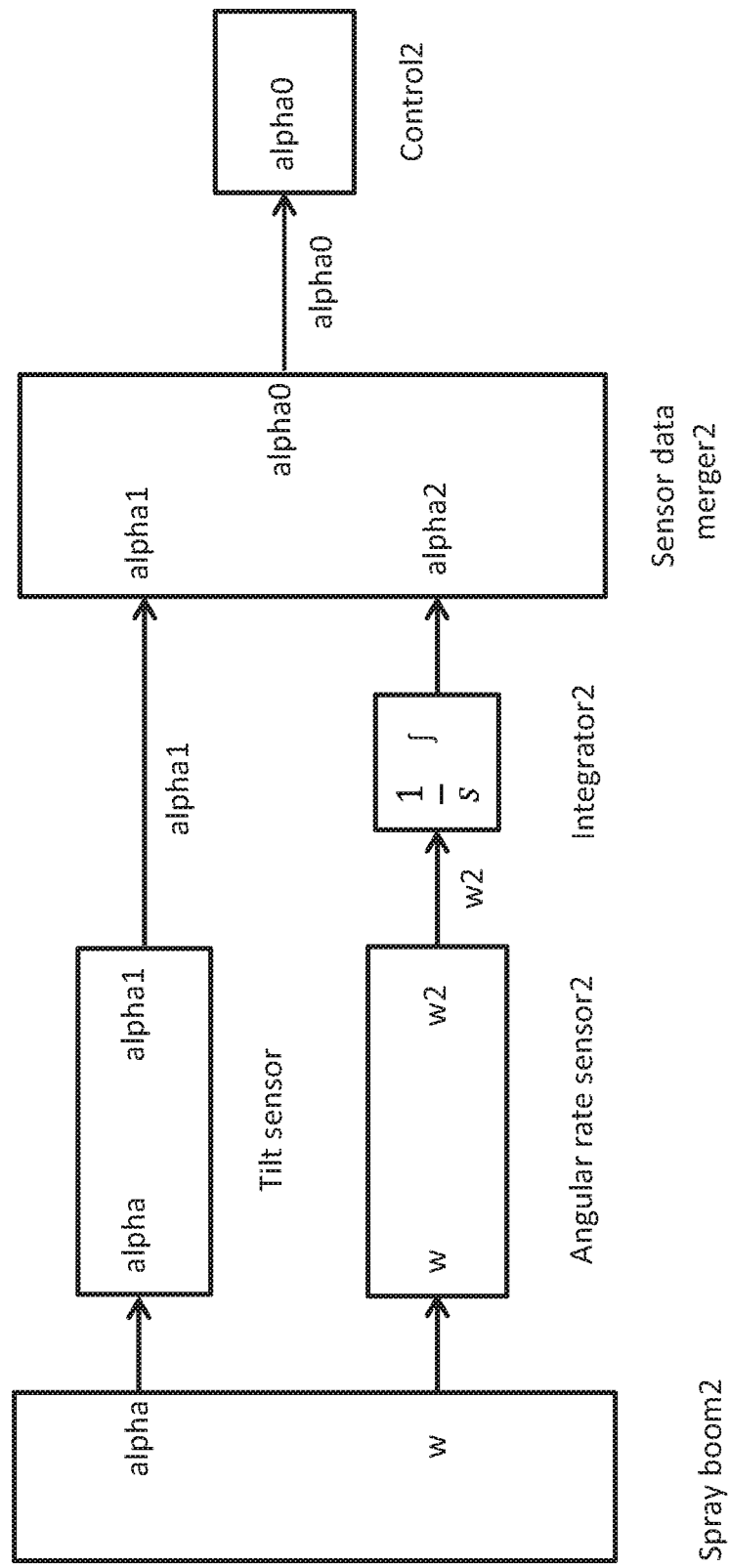

In addition, FIG. 6B illustrates a further exemplary embodiment for obtaining sensor data that can be used for controlling the positioning of the spray boom. The reference plane in this instance is an artificial horizon. In this circuit, only the tilt angle alpha of the spray boom is detected by means of a tilt sensor at the spray boom and the angular velocity w of the spray boom is detected by an angular rate sensor, independently of the rotary movements of the carrier vehicle. An angle alpha2 is calculated by integration from the angular rate. In the sensor data merger, a filtered angle alpha0 is again calculated herefrom, which is used for the control.

Figure 7A:
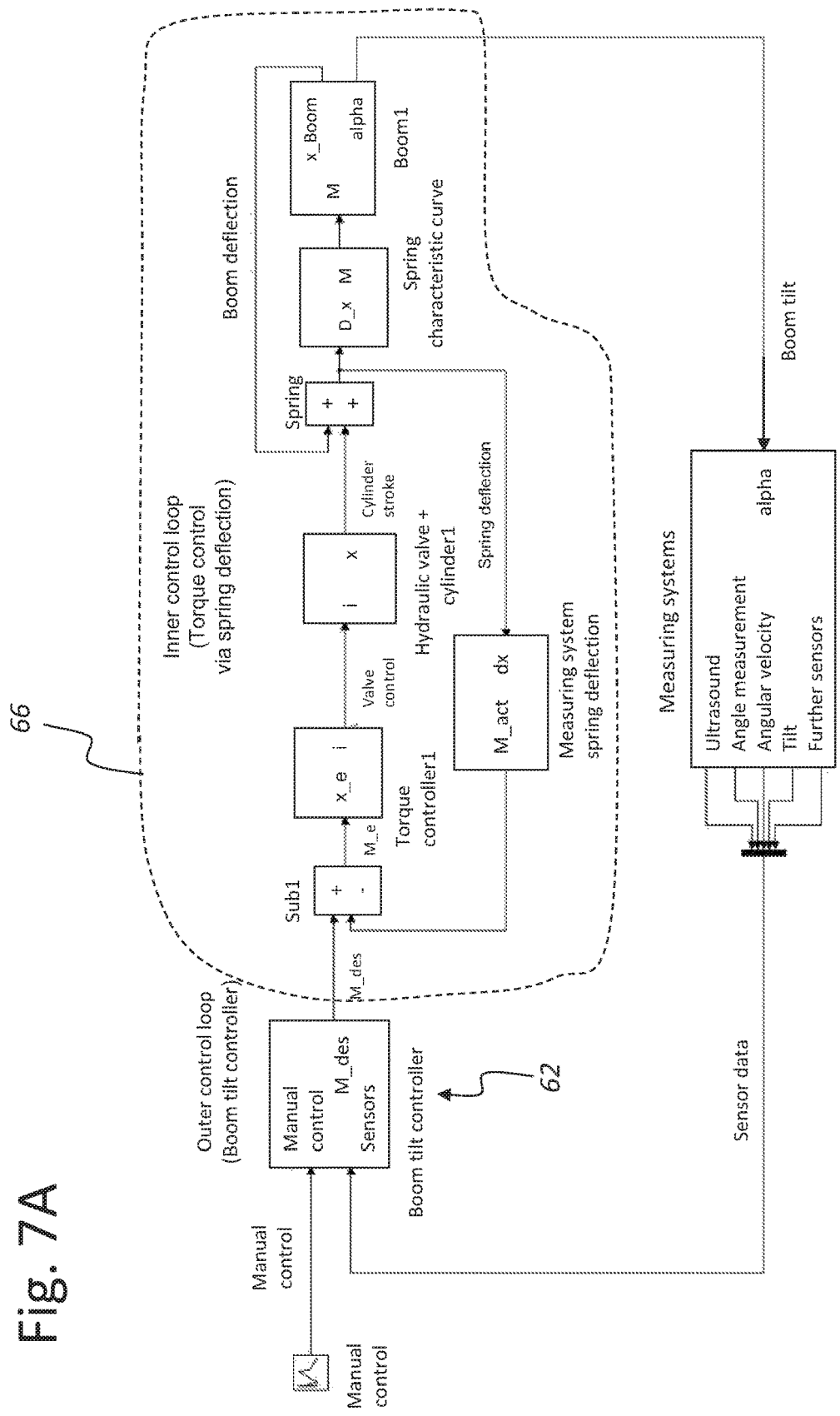
Figure 7B:
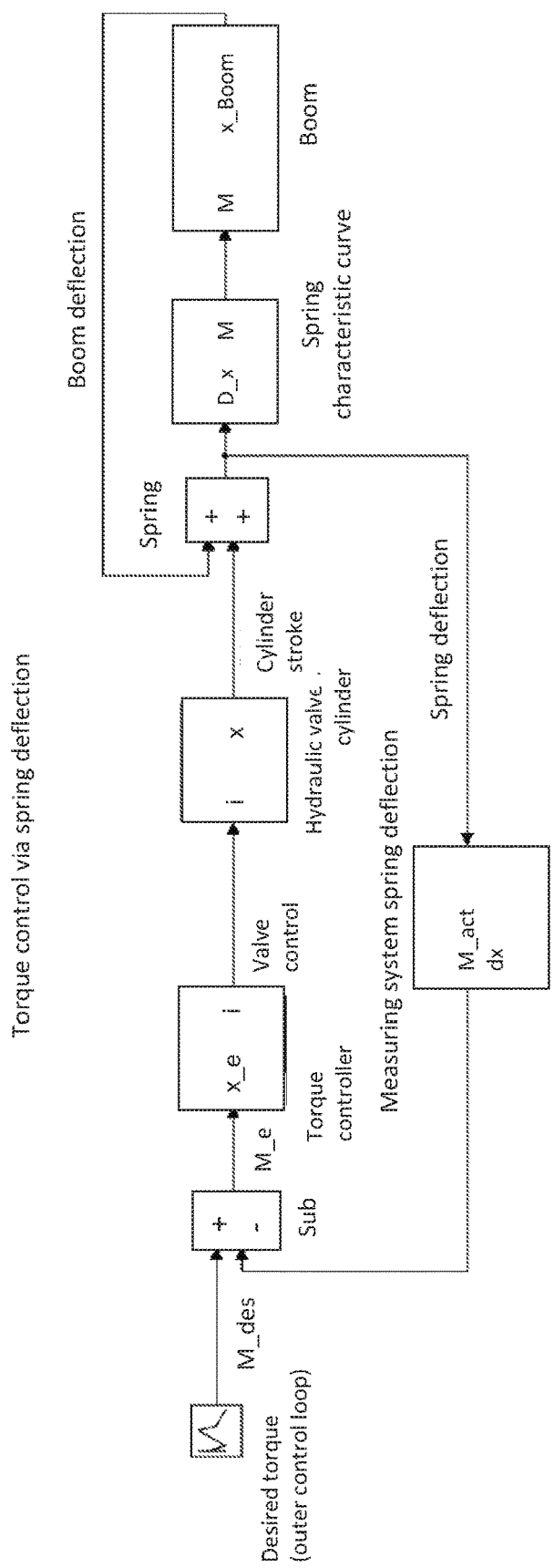

Altogether, the four schematic block diagrams of FIG. 7 show a cascade-connected, two-stage control loop for adjusting the boom linked to the carrier vehicle and the circuitry of the control loop. The inner control loop 66, which is circled by a dashed line (FIGS. 7A and 7C), controls the torque induced into the spray boom for the purpose of adjusting the spray boom. The control is carried out independently of the present position and rotary movement of the boom. This can be realized as follows: the spring deflection can be controlled according to FIG. 7B. The spring force in this instance is proportional to the deflection and thus—via a given lever arm—also proportional to the torque. The induced torque is thus also proportional to the controlled spring deflection.

Optionally, pressure control of the transmission means that is employed can also be carried out according to FIG. 7C and FIG. 7D. The adjustment force in this instance is proportional to the pressure of the transmission means and thus—via the given lever arm—also proportional to the torque. The induced torque is thus also proportional to the controlled pressure.

If the respective control variable (pressure or spring deflection) changes due to an external disturbance (caused, for instance, by a rotary movement of the carrier vehicle), this control loop will very quickly compensate for this control error and ensure that it is always the desired torque that is induced into the boom. If it is intended that no torque is induced, the inner control loop will receive the value zero for the desired value. The inner control loop then controls the respective control variable such that no torque will be induced, even if the external influences change, for example, due to a movement of the carrier vehicle.

The outer control loop 62 (cf. FIG. 7A and FIG. 7C) encloses the inner control loop 66 and controls the desired value of the control loop 66. A desired torque, which is controlled by the inner control loop 6, is thus the control variable of the outer control loop 62. The illustration in FIG. 8 shows this outer control loop 62 of the boom adjustment in a schematic block diagram. The task of this control loop is to control the boom by way of the control variable torque, based on the position and the movements of the boom and on the manual operation. The position and movement of the boom can be detected via various sensors in different ways, such as by angle sensors, angular rate sensors, by an artificial horizon and/or by manual controls.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

10 Distribution apparatus
12 Carrier vehicle
14 Tank
16 Boom, spray boom
18 Cantilevered arms
20 Suspension
22 Driving direction
24 Carrier frame
26 Actuating element
28 Linear cylinder, hydraulic cylinder, pneumatic cylinder
30 Differential pressure sensor, pressure sensor
32 Sensor arrangement, sensor system
34 Output signals
36 Control unit, regulating unit
38 Sensor signals, desired value signals
40 Distance sensor
42 Ground
44 Actuating signal
46 Linkage
48 Piston rod
50 Bolt
52 Middle part
54 Pivot axis, suspension point
56 Acceleration sensor, gyroscope
58 Slot
60 Pressure spring
62 Outer control loop
64 Desired signal
66 Inner control loop
68 Hydraulic pressure supply

The invention claimed is:

1. An apparatus for spreading liquid and/or solid active agents, comprising:
   a carrier vehicle;
   at least one spray boom arranged pivotably about at least one pivot axis; at least one sensor arrangement for detecting an angular velocity and/or an angular position of the spray boom about the pivot axis in relation to a reference plane and/or in relation to a ground surface;
   a control unit operable to process output signals of the at least one sensor arrangement and to generate control signals, wherein the control unit influences or controls, the angular position and/or the angular velocity by at least two coupled control loops;
   at least one actuator influencing the present angular position of the spray boom about the pivot axis based in response to control signals from the control unit;
   wherein a desired value and/or a desired torque for the at least one actuator is generatable from the output signals of the at least one sensor arrangement by the control unit in an outer control loop;
   wherein an actual torque, which moves and/or influences the spray boom, and/or an actual value, which is based on actuator deflections and/or on control signals from the at least one actuator, is detectable in an inner control loop and is used for generating a correction value for achieving the desired torque and/or the desired value; and
   wherein the inner control loop takes into account further sensor data comprising an adjustment torque which is induced by the actuator into the spray boom and which is measured or is derived from the interaction of the actuator with the spray boom, and wherein the further sensor data are obtained in immediate connection with control signals of the at least one actuator and/or its detected interaction with the movably suspended spray boom.

2. The apparatus as recited in claim 1, in which the outer control loop generates a desired value from sensor data of the at least one sensor arrangement for the purpose of controlling the inner control loop and/or the at least one actuator, which specifies a desired position for the spray boom.

3. The apparatus as recited in claim 1, in which the at least one sensor arrangement for detecting the angular velocity (w) and/or the angular position of the spray boom about the pivot axis in relation to the reference plane comprises at least one angular rate sensor, rotational angular velocity sensor, and/or angular acceleration sensor arranged on the boom.

4. The apparatus as recited in claim 1, in which the at least one sensor arrangement for detecting the angular velocity and/or the angular position of the spray boom about the pivot axis in relation to the reference plane comprises at least one angular rate sensor, rotational angular velocity sensor, and/or angular acceleration sensor arranged on the carrier vehicle.

5. The apparatus as recited in claim 1, in which the at least one actuator is formed by at least one double-acting linear actuator operating with fluidic pressure, which linear actuator produces an actuating connection between the carrier vehicle and the pivotable spray boom, wherein a piston of the linear actuator, which piston is coupled with spray boom and is movable in a cylinder chamber between two end positions, separates from each other two pressure chambers, which are in each case impingeable with fluidic actuating pressure for each of the two adjustment directions of the spray boom.

6. The apparatus as recited in claim 1, in which the actuator is formed by at least two linear actuators operating in countersense and each with fluidic pressure, which linear actuators produce an actuating connection between the carrier vehicle and the pivotable spray boom, wherein each of the two linear actuators has one pressure chamber each, and wherein in each case one of the two linear actuators is impingeable with fluidic actuating pressure for one specified adjustment direction of the spray boom.

7. A method for controlling an apparatus as recited in claim 1 by control of the angular position of the spray boom arranged movably about a pivot axis on a carrier vehicle based on a present angular position and/or on a measured differential pressure in at least two pressure chambers of at least one actuator operating with fluidic pressure,
   wherein at least an angular velocity and/or an angular position of the boom about the pivot axis in relation to a reference plane and/or in relation to a ground surface is detected;
   from which control signals for at least one actuator for influencing the present angular position of the spray boom about the pivot axis are generated in a control unit, which influences or controls the spray boom in its angular position and/or in its angular velocity by at least two coupled control loops;
   wherein a desired value and/or a desired torque for the at least one actuator is generated from the output signals of the at least one sensor arrangement by the control unit in an outer control loop;
   and wherein an actual torque, which moves and/or influences the spray boom, which torque is based on actuator deflections and/or on control signals from the at least one actuator, is detected in an inner control loop and is processed for generating a correction value for the desired deflection.

8. The method as recited in claim 7, in which both the measurement data of the at least one sensor arrangement and the differential pressures between the two pressure chambers of the at least one actuator are used for determining a present angular position and/or a desired angular position between the spray boom and the carrier vehicle and are processed by a control unit, which controls the at least one actuator.

9. The method as recited in claim 7, in which the outer control loop generates a desired value from sensor data of the at least one sensor arrangement for the purpose of controlling the at least one actuator, which specifies a desired position for the spray boom.

10. The method as recited in claim 7, in which the inner control loop takes into account further sensor data, which are obtained in immediate connection with control signals of the at least one actuator and/or its detected interaction with the movably suspended spray boom.

11. The method as recited in claim 10, in which the further sensor data are an adjustment torque, which is induced by the actuator into the boom and which is measured or is derived from the interaction of the actuator with the spray boom.

* * * * *